(12) United States Patent
Osaki et al.

(10) Patent No.: US 11,769,640 B2
(45) Date of Patent: Sep. 26, 2023

(54) TOUCH SENSOR UNIT

(71) Applicant: AISIN CORPORATION, Kariya (JP)

(72) Inventors: Yuki Osaki, Kariya (JP); Tomohiro Ikai, Kariya (JP)

(73) Assignee: AISIN CORPORATION, Kariya (JP)

(*) Notice: Subject to any disclaimer, the term of this patent is extended or adjusted under 35 U.S.C. 154(b) by 0 days.

(21) Appl. No.: 17/584,931

(22) Filed: Jan. 26, 2022

(65) Prior Publication Data
US 2022/0246366 A1 Aug. 4, 2022

(30) Foreign Application Priority Data

Feb. 3, 2021 (JP) ................. 2021-015779

(51) Int. Cl.
H01H 3/16 (2006.01)
H01H 9/02 (2006.01)
E05F 15/44 (2015.01)
B60J 5/10 (2006.01)
H01H 1/24 (2006.01)

(52) U.S. Cl.
CPC ............ H01H 3/161 (2013.01); E05F 15/44 (2015.01); H01H 9/02 (2013.01); B60J 5/101 (2013.01); E05Y 2400/54 (2013.01); E05Y 2900/546 (2013.01); H01H 1/24 (2013.01); H01H 2003/165 (2013.01); H01H 2225/008 (2013.01)

(58) Field of Classification Search
CPC ............ H01H 3/161; H01H 9/02; H01H 1/24; H01H 3/162; H01H 9/226; H01H 2003/165; H01H 3/168; H01H 3/16; E05F 15/44; E05F 15/42; E05F 15/02; E05F 15/603; B60J 5/101; B60J 5/06; B60J 5/00; B60J 10/08; B60J 7/06; E06B 7/23

USPC .................... 200/47, 61.43; 49/28
See application file for complete search history.

(56) References Cited

U.S. PATENT DOCUMENTS

| | | | | |
|---|---|---|---|---|
| 5,839,227 A | * | 11/1998 | Gardner | E05F 15/00 49/27 |
| 5,921,026 A | * | 7/1999 | Miller | E05F 15/42 49/27 |
| 2009/0100755 A1 | * | 4/2009 | Ishihara | E05F 15/46 49/31 |
| 2013/0333488 A1 | * | 12/2013 | Ishihara | G01L 1/04 73/862.621 |

(Continued)

FOREIGN PATENT DOCUMENTS

JP 2015-174633 A 10/2015

Primary Examiner — Edwin A. Leon
Assistant Examiner — Iman Malakooti
(74) Attorney, Agent, or Firm — Oblon, McClelland, Maier & Neustadt, L.L.P.

(57) ABSTRACT

A touch sensor unit, that is installed on one of an opening provided in a vehicle and an opening and closing body configured to open and close the opening, includes: a touch sensor having a long sensor body; and a bracket configured to hold the touch sensor in a longitudinal direction of the sensor body and fixed to one of the opening and the opening and closing body. One of the touch sensor and the bracket includes an inserting portion including a locking piece, the other of the touch sensor and the bracket includes a holding portion including a locking portion locked to the locking piece and configured to accommodate the inserting portion, and one of the inserting portion and the holding portion is made of an elastomer having an elastic modulus lower than that of the other.

14 Claims, 13 Drawing Sheets

(56) References Cited

U.S. PATENT DOCUMENTS

2015/0267453 A1  9/2015  Matsumoto et al.

* cited by examiner

TOUCH SENSOR UNIT

CROSS REFERENCE TO RELATED APPLICATIONS

This application is based on and claims priority under 35 U.S.C. § 119 to Japanese Patent Application 2021-015779, filed on Feb. 3, 2021, the entire content of which is incorporated herein by reference.

TECHNICAL FIELD

This disclosure relates to a touch sensor unit.

BACKGROUND DISCUSSION

In the related art, a touch sensor unit that is assembled to an opening and closing body such as a back door or a sliding door that opens and closes a door opening of a vehicle body, and detects contact between the opening and closing body that performs a closing operation and an object is known. For example, JP 2015-174633A (Reference 1) describes a touch sensor unit including a bracket installed along a peripheral edge of an opening and closing body and a long touch sensor supported by the bracket. Further, Reference 1 describes that an adhesive tape or the like is used when a separately configured touch sensor is attached to the bracket.

When the adhesive tape or the like is used to attach the touch sensor as in the touch sensor unit as described above, it is likely to increase a time required for an attachment operation, and cause variation in an attachment position of the touch sensor.

SUMMARY

A touch sensor unit according to an aspect of this disclosure is installed on one of an opening provided in a vehicle and an opening and closing body configured to open and close the opening. The touch sensor unit includes a touch sensor having a long sensor body, and a bracket configured to hold the touch sensor in a longitudinal direction of the sensor body and fixed to one of the opening and the opening and closing body. One of the touch sensor and the bracket includes an inserting portion including a locking piece, the other of the touch sensor and the bracket includes a holding portion including a locking portion locked to the locking piece and configured to accommodate the inserting portion, and one of the inserting portion and the holding portion is made of an elastomer having an elastic modulus lower than that of the other.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

First Embodiment

Hereinafter, a vehicle including a touch sensor unit will be described with reference to the drawings.

Figure 1:
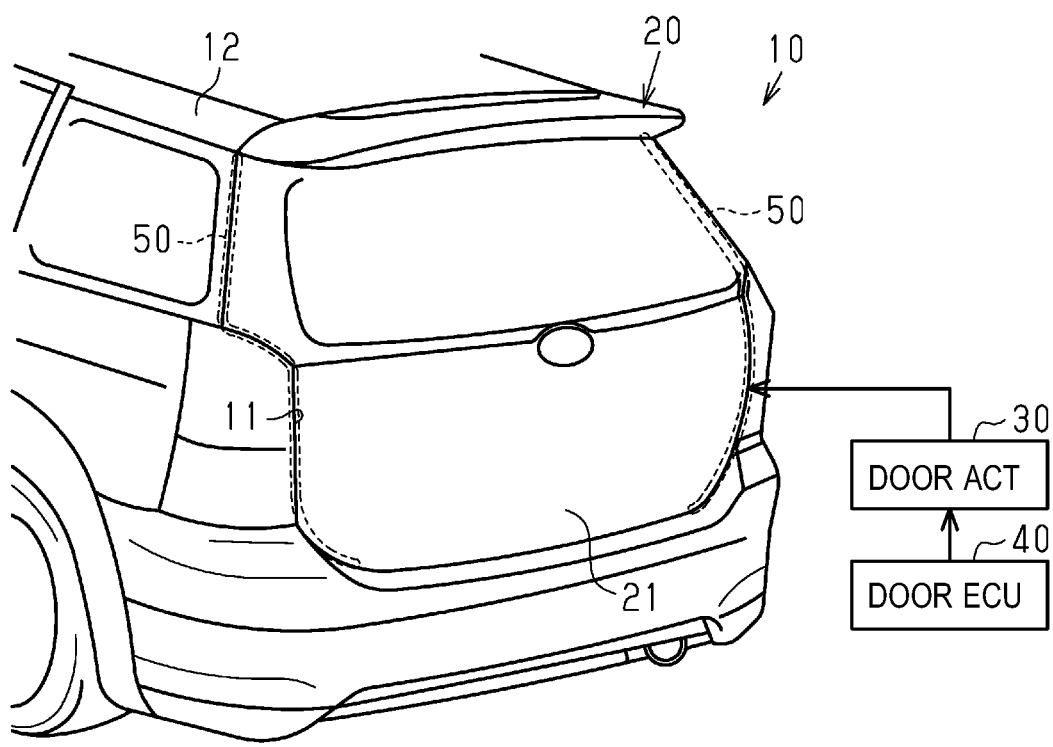
FIG. 1 is a schematic view of a vehicle including a touch sensor unit according to a first embodiment.

As shown in FIG. 1, a vehicle 10 includes a vehicle body 12 including a door opening 11, a back door 20 that opens and closes the door opening 11, a door actuator 30 that drives the back door 20, and a door ECU 40 that controls the door actuator 30.

The door opening 11 is located at a rear portion of the vehicle body 12. The door opening 11 has a rectangular shape in which a width direction is a longitudinal direction and a vertical direction is a lateral direction when the vehicle body 12 is viewed from a rear side. In the first embodiment, the door opening 11 corresponds to an example of an "opening".

The back door 20 is opened and closed by the door actuator 30 between a fully closed position in which the door opening 11 is fully closed and a fully open position in which the door opening 11 is fully opened. In the first embodiment, the back door 20 corresponds to an example of an "opening and closing body". The back door 20 includes a door body 21 having a shape corresponding to the door opening 11 and two touch sensor units 50 installed along both side edges of the door body 21.

Next, the "touch sensor unit 50" will be described in detail.

Figure 2:
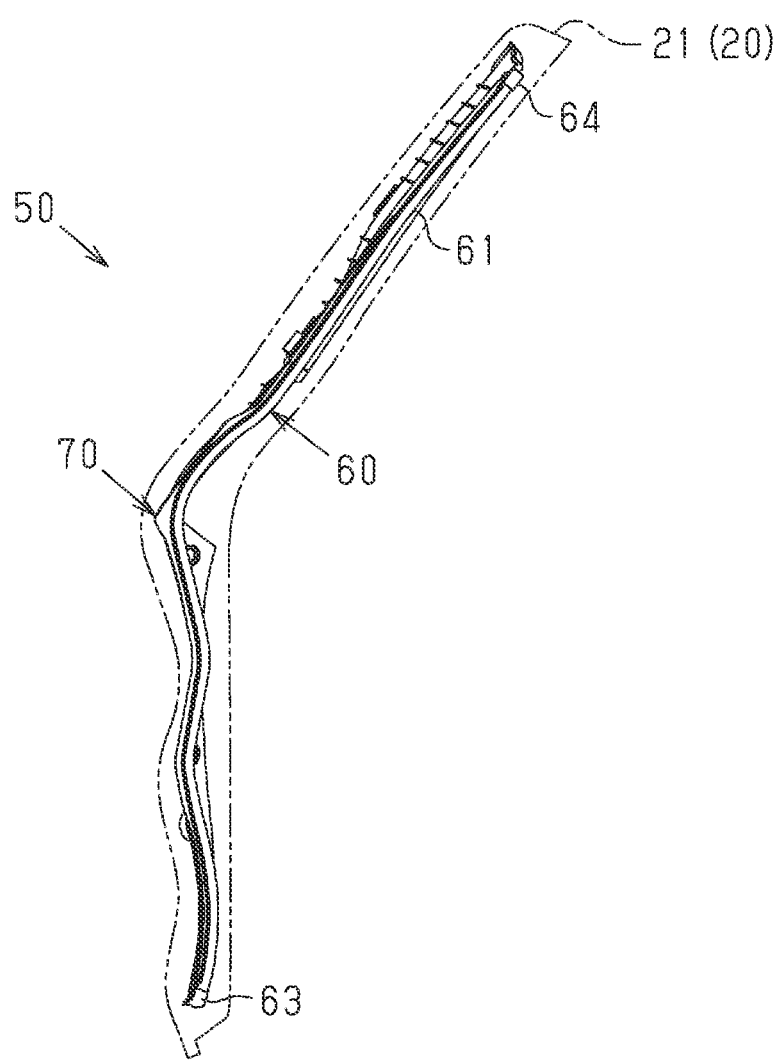
FIG. 2 is an overall view of the touch sensor unit according to the first embodiment.

As shown in FIG. 1, the two touch sensor units 50 are installed on a surface, which faces a vehicle interior, of the door main body 21 that is located at the fully closed position. Shapes of the two touch sensor units are symmetrical in the width direction. FIG. 2 shows the touch sensor unit 50 installed on a right side edge of the door body 21.

In the following description, in the longitudinal direction of the touch sensor unit 50, an end portion located near a rotation center of the back door 20 is also referred to as a first end portion, and an end portion opposite to the first end portion is also referred to as a second end portion. The longitudinal direction of the touch sensor unit 50 is simply referred to as a longitudinal direction.

As shown in FIG. 2, the touch sensor unit 50 includes a touch sensor 60 that detects contact with an object, and a bracket 70 that holds the touch sensor 60. The touch sensor unit 50 is configured by mounting the touch sensor 60 on the bracket 70. In the following description, a moving direction of the touch sensor 60 when the touch sensor 60 is mounted on the bracket 70 is also referred to as an "inserting direction", and a direction orthogonal to both the longitudinal direction of the touch sensor unit 50 and the inserting direction is also referred to as the "width direction".

Hereinafter, the "touch sensor 60" will be described in detail.

Figure 3:
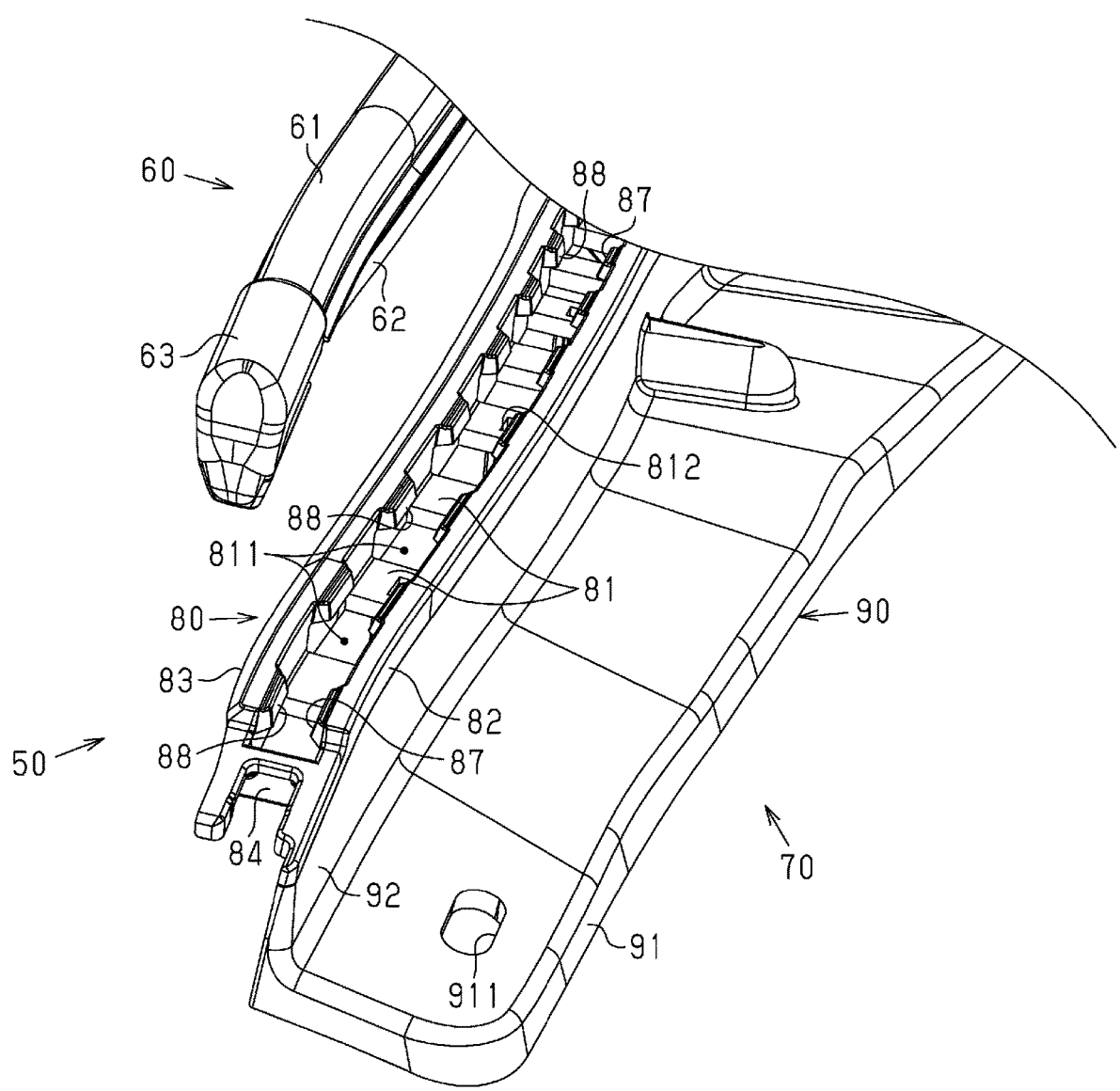
FIG. 3 is a perspective view of the touch sensor unit according to the first embodiment.
Figure 4:
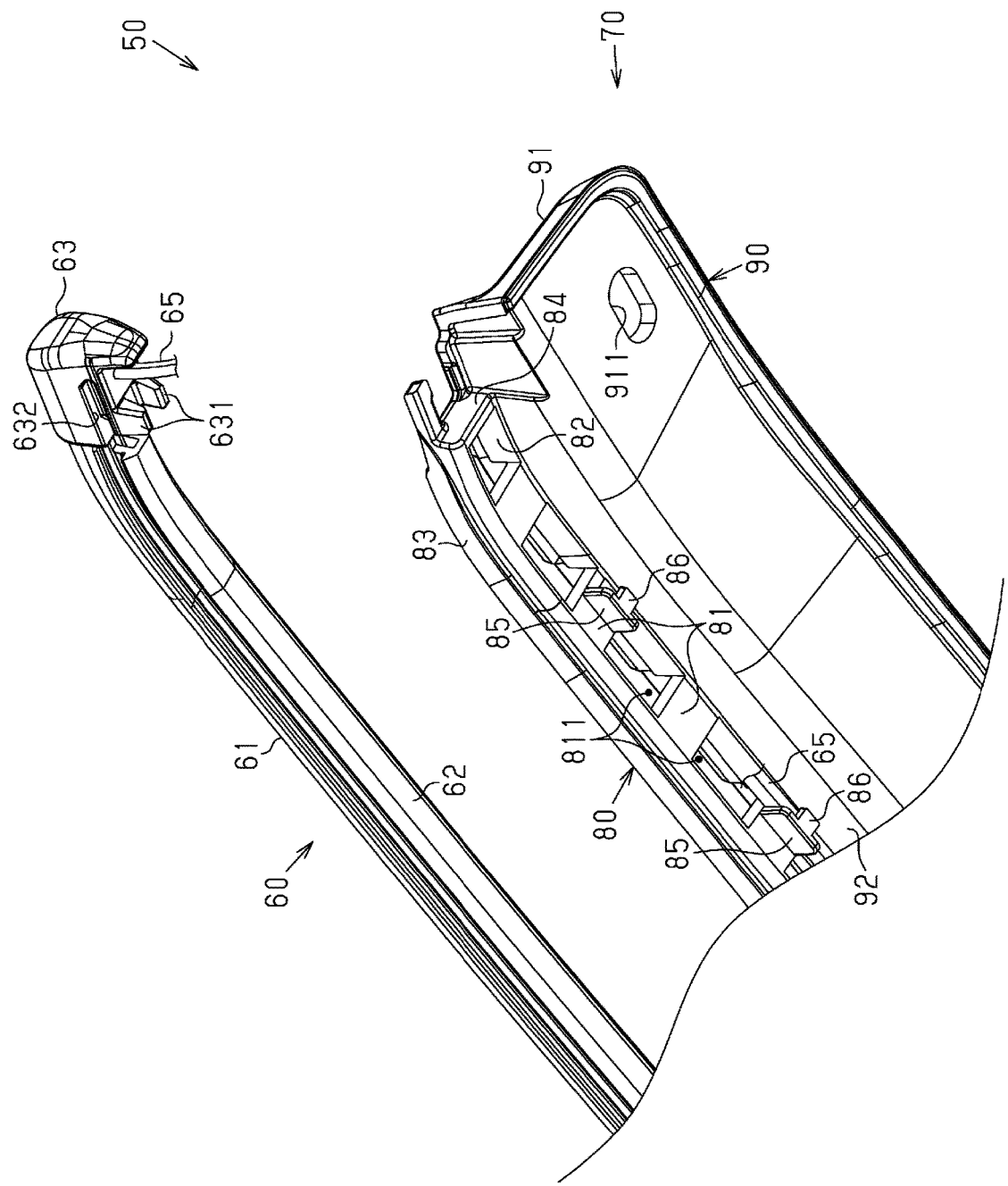
FIG. 4 is a perspective view of the touch sensor unit according to the first embodiment.

As shown in FIGS. 2 to 4, the touch sensor 60 includes a long sensor body 61 that detects the contact with the object, an inserting portion 62 that extends from the sensor body 61, two positioning portions 63 and 64 that respectively fix both end portions of the sensor body 61 in the longitudinal direction to the bracket 70, and a wire harness 65 that connects the sensor body 61 and the door ECU 40.

In the touch sensor 60, the sensor body 61 and the inserting portion 62 are long members corresponding to a length of a side edge of the back door 20. In the touch sensor 60, the sensor body 61 and the inserting portion 62 are integrally molded by extrusion molding. Therefore, the sensor body 61 and the inserting portion 62 have a substantially constant cross-sectional shape orthogonal to the longitudinal direction.

Figure 5:
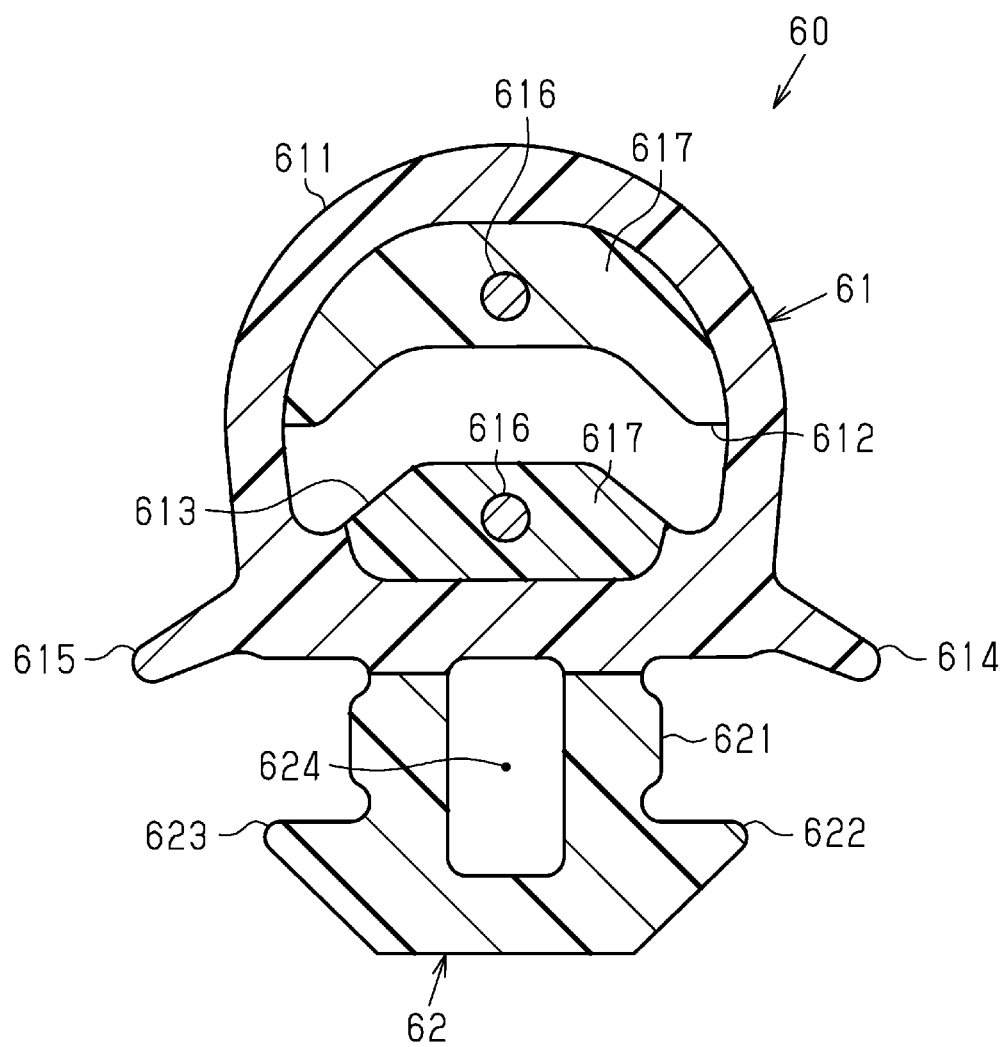
FIG. 5 is a cross-sectional view of a touch sensor according to the first embodiment.

As shown in FIG. 5, the sensor body 61 includes a tubular portion 611 having a tubular shape, a first conductive portion 612 and a second conductive portion 613 located inside the tubular portion 611, and a first elastic piece 614 and a second elastic piece 615 located outside the tubular portion 611. As described above, all the constituent members of the sensor body 61 are long members.

The tubular portion 611 is made of an insulating elastomer. That is, the tubular portion 611 is both an insulator and an elastic body. The first conductive portion 612 and the second conductive portion 613 include core wires 616 and covering portions 617 that cover the core wires 616 respectively. The core wire 616 is made of a conductive metal material, and the covering portion 617 is made of a conductive elastomer. That is, the covering portion 617 is both a conductor and an elastic body. The first conductive portion 612 and the second conductive portion 613 are arranged inside the tubular portion 611 at intervals in a direction orthogonal to the longitudinal direction. Specifically, the first conductive portion 612 and the second conductive portion 613 are arranged at intervals in the inserting direction.

The first elastic piece 614 and the second elastic piece 615 extend from both sides of the tubular portion 611 in the width direction. The first elastic piece 614 and the second elastic piece 615 are inclined toward the inserting direction as advancing to an outer side in the width direction. The first elastic piece 614 and the second elastic piece 615 are made of the same material as the tubular portion 611.

When the object is in contact with the sensor body 61, in other words, when the object is in contact with the tubular portion 611, the tubular portion 611 is crushed in the direction orthogonal to the longitudinal direction. Then, the first conductive portion 612 and the second conductive portion 613 are in contact with each other inside the tubular portion 611, and the first conductive portion 612 and the second conductive portion 613 are conducted.

The inserting portion 62 is made of an elastomer having an elastic modulus higher than that of the tubular portion 611. The inserting portion 62 is different in color from the tubular portion 611, the first elastic piece 614, and the second elastic piece 615. As a method for setting a color of the inserting portion 62 to a different color, for example, a paint and a colored filler may be mixed into the elastomer forming the inserting portion 62, or a paint may be applied to a surface of the inserting portion 62. The inserting portion 62 includes a base portion 621 extending from the tubular portion 611, and a first locking piece 622 and a second locking piece 623 extending from a tip end of the base portion 621.

The base portion 621 extends from the tubular portion 611 in the direction orthogonal to the longitudinal direction. Specifically, the base portion 621 extends from the tubular portion 611 in the inserting direction. A cross-sectional shape orthogonal to the longitudinal direction of the base portion 621 is a rectangular shape. The base portion 621 has an internal space 624 penetrating in the longitudinal direction. In this respect, it can be said that the inserting portion 62 has a hollow shape over the longitudinal direction.

The first locking piece 622 extends from a tip end portion of the base portion 621 in the width direction, and the second locking piece 623 extends from the tip end portion of the base portion 621 in a direction opposite to the first locking piece 622. The first locking piece 622 and the second locking piece 623 are tapered. Specifically, a tip end surface of the first locking piece 622 and a tip end surface of the second locking piece 623 are inclined toward a center in the width direction as advancing in the inserting direction.

As shown in FIG. 4, a positioning portion 63 includes two contact pieces 631 extending in the inserting direction in a state of being spaced apart in the width direction. The positioning portion 63 includes two engaging grooves 632 on both side surfaces in the width direction. The two engaging grooves 632 have a depth direction in the width direction and extend in the longitudinal direction. End portions of the core wire 616 of the first conductive portion 612 and the second conductive portion 613 and an end portion of the wire harness 65 are connected to the positioning portion 63. Inside the positioning portion 63, the core wire 616 of the first conductive portion 612 and the second conductive portion 613 are connected to the wire harness 65. The other positioning portion 64 has substantially the same configuration as the positioning portion 63 except that the core wires 616 of the first conductive portion 612 and the second conductive portion 613 and the wire harness 65 are not connected.

One end of the wire harness 65 is connected to the positioning portion 63, and the other end of the wire harness 65 is connected to the door ECU 40. As shown in FIG. 4, the wire harness 65 is routed along a portion near a second end portion of the bracket 70.

Next, the "bracket 70" will be described in detail.

The bracket 70 is fixed to the back door 20 via fastening members such as screws and bolts. Therefore, the bracket 70 is curved in accordance with a shape of the side edge of the back door 20. In this regard, if the shape of the bracket 70 is changed, the touch sensor unit 50 can be applied to the back door 20 having a different shape without greatly changing a structure of the touch sensor 60. The bracket 70 is a resin-molded product made of a thermoplastic elastomer or the like. That is, the bracket 70 is made of a material having an elastic modulus higher than that of the inserting portion 62 of the touch sensor 60 in a temperature range in which the touch sensor unit 50 is used. It is preferable that the bracket 70 has the same color as the tubular portion 611 of the touch sensor 60.

Figure 6:
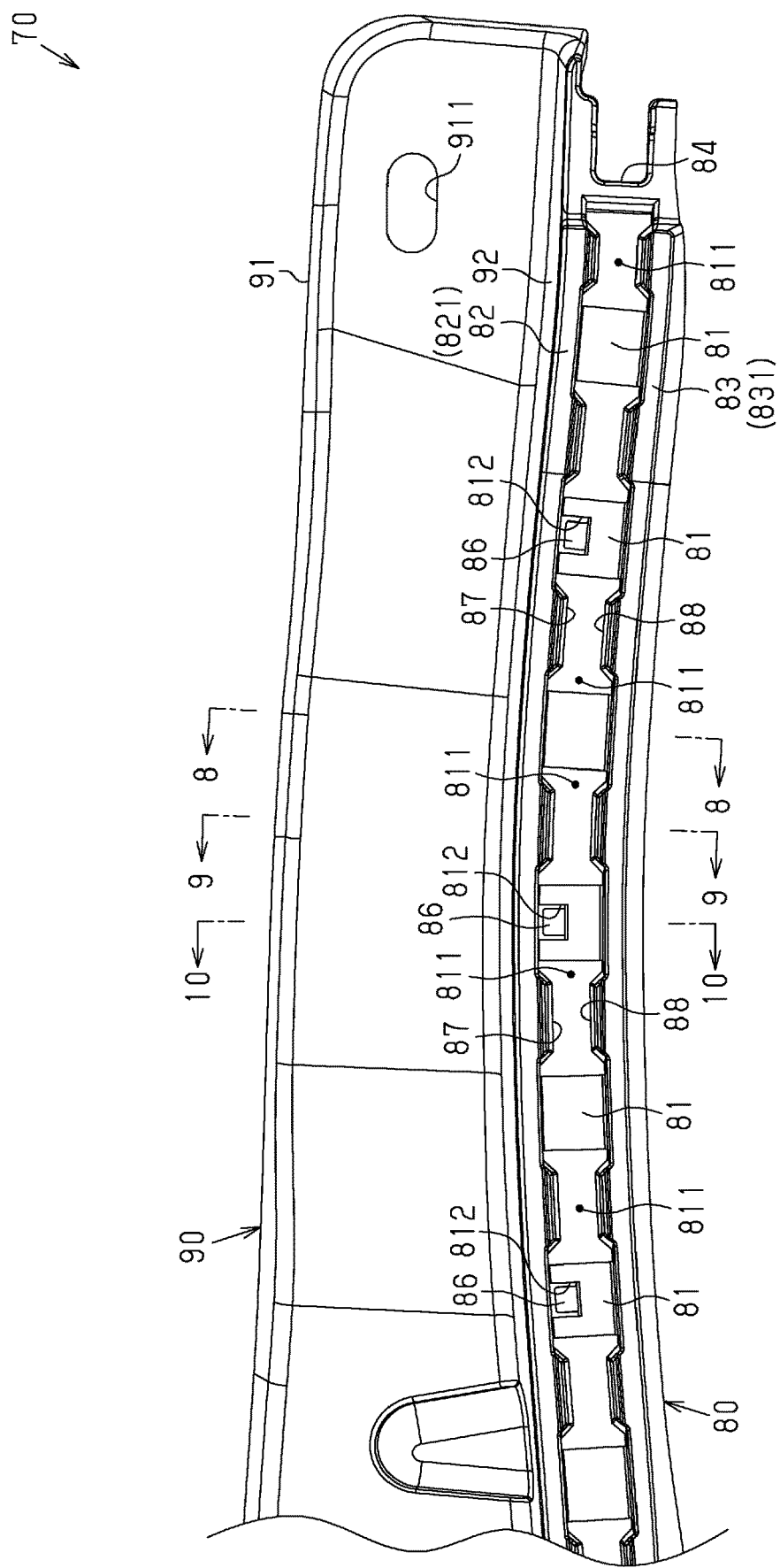
FIG. 6 is a plan view of a bracket according to the first embodiment.
Figure 7:
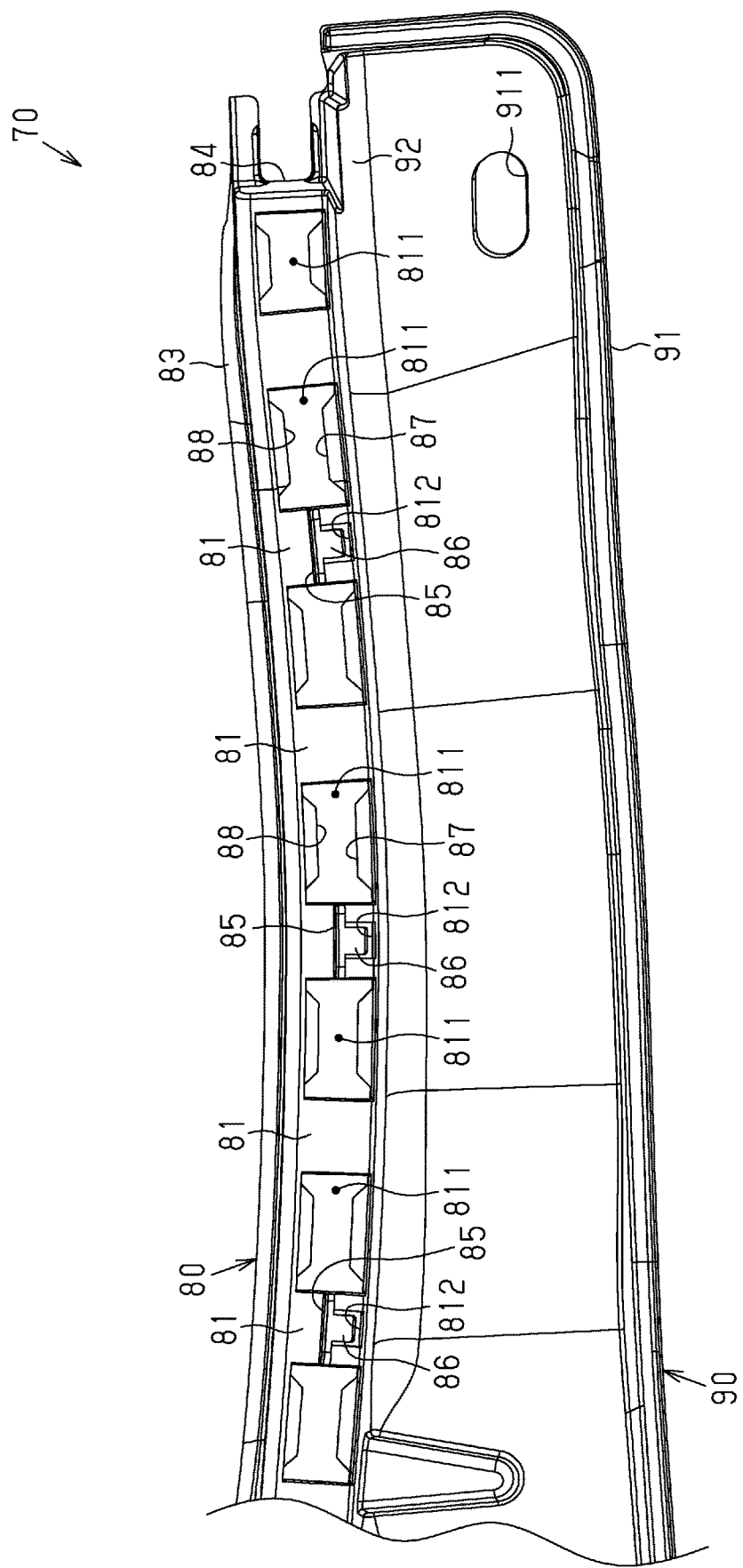
FIG. 7 is a bottom view of the bracket according to the first embodiment.

As shown in FIGS. 3, 4, 6, and 7, the bracket 70 includes a holding portion 80 that accommodates the inserting portion 62 of the touch sensor 60 and a fixing portion 90 that is fixed to the back door 20. FIG. 6 is a view of the bracket 70 as viewed from the inserting direction, and FIG. 7 is a view of the bracket 70 as viewed from a direction opposite to the inserting direction.

The holding portion 80 includes a bottom wall 81 extending in the longitudinal direction, a first side wall 82 and a second side wall 83 extending from the bottom wall 81, and two connecting walls 84 that connect both end portions of the first side wall 82 and the second side wall 83 respectively in the longitudinal direction. As shown in FIGS. 4 and 7, the holding portion 80 includes an erected wall 85 extending from the bottom wall 81, a locking wall 86 extending from a tip end of the erected wall 85, and a plurality of first locking portions 87 and a plurality of second locking portions 88 that are locked to the inserting portion 62 of the touch sensor 60.

As shown in FIGS. 6 and 7, the bottom wall 81 includes a plurality of first through holes 811 and a plurality of second through holes 812 penetrating the bottom wall 81 in a plate thickness direction. The plurality of first through holes 811 are provided at intervals in the longitudinal direction. The first through hole 811 has a rectangular shape when viewed from the inserting direction. In the first embodiment, a length of the first through hole 811 in the width direction is equal to a length of the bottom wall 81 in the width direction. Therefore, in the first embodiment, the bottom wall 81 extending in the longitudinal direction is divided into a plurality of parts in the longitudinal direction. The plurality of second through holes 812 are provided only at positions near the second end portion of the bracket 70. The second through hole 812 has a rectangular shape smaller than that of the first through hole 811 in a plan view from the inserting direction. A length of the second through hole 812 in the width direction is shorter than the length of the bottom wall 81 in the width direction. The second through hole 812 is closer to the first side wall 82 than the second side wall 83 in the width direction.

As described above, since the bracket 70 is curved with respect to the longitudinal direction, the plate thickness direction of the bottom wall 81 faces various directions with respect to the longitudinal direction. However, as shown in FIGS. 6 and 7, the plurality of first through holes 811 and the plurality of second through holes 812 all face the same direction. In the following description, among two surfaces intersecting the plate thickness direction of the bottom wall 81, a surface on which the first side wall 82 and the second side wall 83 extend is also referred to as a "front surface", and a surface on which the erected wall 85 extends is referred to as a "back surface".

Figure 8:
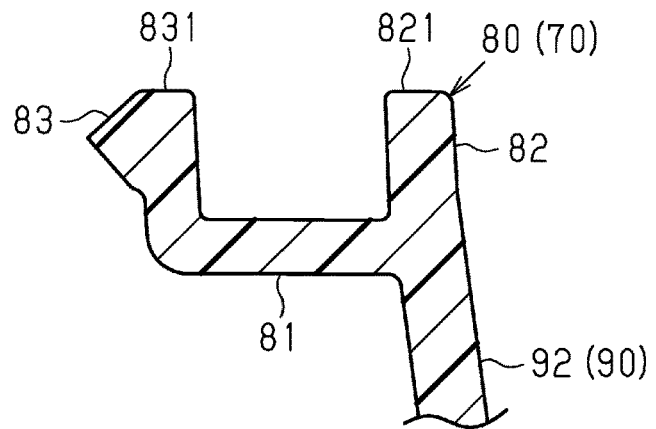
FIG. 8 is a cross-sectional view taken along line 8-8 of FIG. 6.

As shown in FIGS. 6 to 8, the first side wall 82 and the second side wall 83 extend in the direction opposite to the inserting direction from both end portions of the bottom wall 81 in the width direction. An interval between the first side wall 82 and the second side wall 83 in the width direction is constant with respect to the longitudinal direction. As shown in FIGS. 6 and 7, the first side wall 82 and the second side wall 83 include portions protruding from the bottom wall 81 in the longitudinal direction at the end portions in the longitudinal direction. In the following description, as shown in FIGS. 8 to 10, a tip end surface of the first side wall 82 is referred to as a first end surface 821, and a tip end surface of the second side wall 83 is referred to as a second end surface 831.

Figure 9:
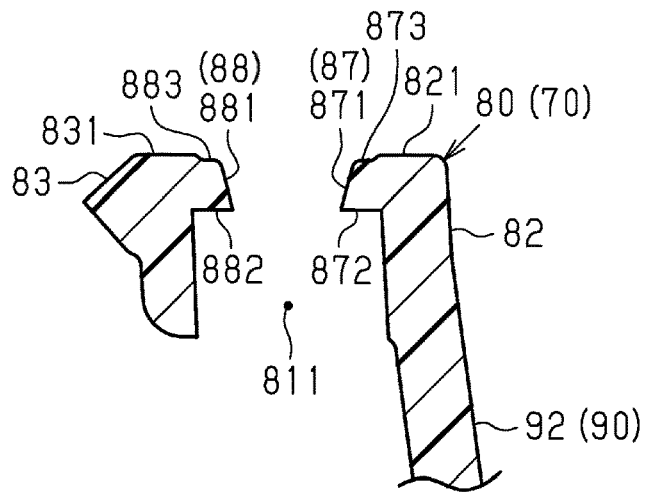
FIG. 9 is a cross-sectional view taken along line 9-9 of FIG. 6.
Figure 10:
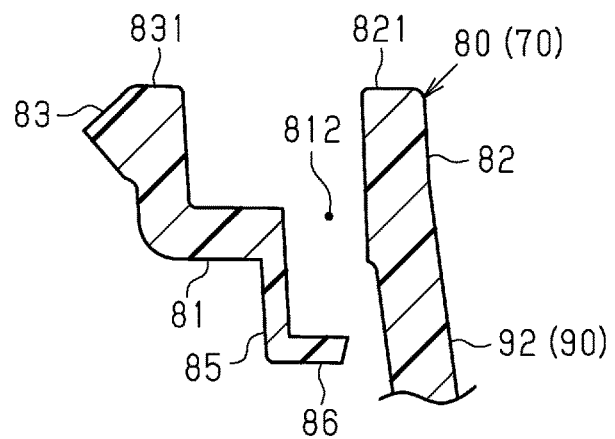
FIG. 10 is a cross-sectional view taken along line 10-10 of FIG. 6.

As shown in FIGS. 6, 7, and 9, the plurality of first locking portions 87 extend from a tip end portion of the first side wall 82 toward the second side wall 83 in a state of being spaced apart in the longitudinal direction. The plurality of second locking portions 88 extend from a tip end portion of the second side wall 83 toward the first side wall 82 in a state of being spaced apart in the longitudinal direction. In the first embodiment, the plurality of first locking portions 87 and the plurality of second locking portions 88 are arranged side by side in the width direction. That is, the plurality of first locking portions 87 and the plurality of second locking portions 88 face each other in the width direction.

As shown in FIG. 6, a length of the first locking portion 87 in the longitudinal direction is shorter as the first locking portion 87 approaches the second side wall 83. Similarly, a length of the second locking portion 88 in the longitudinal direction is shorter as the second locking portion 88 approaches the first side wall 82. In this regard, when viewed from the inserting direction, the first locking portion 87 and the second locking portion 88 have a trapezoidal shape.

As shown in FIG. 9, the first locking portion 87 has a first inclined surface 871 that constitutes a tip end surface, a first locking surface 872 to which the first locking piece 622 of the touch sensor 60 is locked, and a first connecting surface 873 that connects the first inclined surface 871 and the first end surface 821 of the first side wall 82. Similarly, the second locking portion 88 has a second inclined surface 881 constituting a tip end surface, a second locking surface 882 that is locked by the second locking piece 623 of the touch sensor 60, and a second connecting surface 883 that connects the second inclined surface 881 and the second end surface 831 of the second side wall 83.

The first inclined surface 871 is inclined so as to approach the second side wall 83 as advancing in the inserting direction. Similarly, the second inclined surface 881 is inclined so as to approach the first side wall 82 as advancing in the inserting direction. In this regard, an interval between the first locking portion 87 and the second locking portion 88 in the width direction gradually narrows toward the inserting direction. A part of the tip end surface of the first locking portion 87 may be the first inclined surface 871, and a part of the tip end surface of the second locking portion 88 may be the second inclined surface 881.

The first connecting surface 873 and the second connecting surface 883 are surfaces intersecting the inserting direction. The first connecting surface 873 is recessed from the first end surface 821 of the first side wall 82 in the inserting direction, and the second connecting surface 883 is recessed from the second end surface 831 of the second side wall 83 in the inserting direction. That is, in the present embodiment, at least a portion of the first connecting surface 873 connected to the first inclined surface 871 is recessed from the first end surface 821 of the first side wall 82 in the inserting direction. Similarly, at least a portion of the second connecting surface 883 connected to the second inclined surface 881 is recessed from the second end surface 831 of the second side wall 83 in the inserting direction. As a result, a step is generated between the first connecting surface 873 and the first end surface 821, and a step is generated between the second connecting surface 883 and the second end surface 831.

In the width direction, the interval between the first locking portion 87 and the second locking portion 88 of the bracket 70 is narrower than a width of the inserting portion 62 of the touch sensor 60. Specifically, in the width direction, a distance from a tip end of the first locking portion 87 to a tip end of the second locking portion 88 is shorter than a distance from a tip end of the first locking piece 622 to a tip end of the second locking piece 623. In the inserting direction, thicknesses of the first locking portion 87 and the second locking portion 88 of the bracket 70 are equal to an interval between the tubular portion 611 of the touch sensor 60 and the first locking piece 622 or an interval between the tubular portion 611 of the touch sensor 60 and the second locking piece 623.

As shown in FIG. 6, when the bracket 70 is viewed from the inserting direction, the plurality of first locking portions 87 and the plurality of second locking portions 88 overlap the plurality of first through holes 811. In other words, in the inserting direction, the plurality of first locking portions 87 and the plurality of second locking portions 88 do not overlap the bottom wall 81. In this regard, it can be said that the first through hole 811 of the bottom wall 81 is provided at a portion overlapping the first locking portion 87 and the second locking portion 88 in the inserting direction.

As shown in FIGS. 3 and 4, the connecting wall 84 connects, in the width direction, the portions protruding from the bottom wall 81 in the longitudinal direction at both end portions of the first side wall 82 and the second side wall 83 in the longitudinal direction. A length of the connecting wall 84 in the inserting direction is longer than that of the bottom wall 81.

As shown in FIG. 7, similarly to the plurality of second through holes 812, the plurality of erected walls 85 are provided only at positions near the second end portion of the bracket 70. As shown in FIGS. 7 and 10, the erected wall 85 extends in the inserting direction from a position displaced from the second through hole 812 in the width direction, that is, a central portion of the bottom wall 81 in the width direction. The erected wall 85 has a rectangular plate shape with the width direction as the plate thickness direction. The erected wall 85 has the same length in the longitudinal direction as the bottom wall 81.

The plurality of locking walls 86 extend from tip end portions of the plurality of erected walls 85 in a direction intersecting the inserting direction. In other words, the locking wall 86 extends toward a coupling wall 92 of the fixing portion 90, which will be described later.

As shown in FIG. 6, when the plurality of locking walls 86 are viewed from the inserting direction, the plurality of locking walls 86 and the plurality of second through holes 812 of the bottom wall 81 overlap each other. The plurality of locking walls 86 are slightly smaller than the plurality of second through holes 812. Therefore, the plurality of locking walls 86 and the bottom wall 81 do not overlap in the inserting direction. In this regard, it can be said that the second through hole 812 of the bottom wall 81 is provided at a portion overlapping the locking wall 86 in the inserting direction.

As shown in FIGS. 3 and 4, the fixing portion 90 includes a fixing wall 91 having a shape corresponding to the back door 20 and the coupling wall 92 that couples the fixing wall 91 and the holding portion 80. The fixing wall 91 has the shape corresponding to the back door 20. The fixing wall 91 includes a fastening hole 911 through which fastening members such as bolts pass. The fastening hole 911 is used to fix the bracket 70 to the back door 20. The coupling wall 92 extends in a direction intersecting the fixing wall 91. The first side wall 82 of the holding portion 80 further extends from a tip end of the coupling wall 92.

For example, when a user operates a button of a portable device or a user operates a button provided on the back door 20, the door ECU 40 opens the back door 20 from the fully closed position or closes the back door 20 from the fully open position. The door ECU 40 determines whether an object such as the user is in contact with the back door 20 during a closing operation based on a signal output from the touch sensor 60. When the door ECU 40 determines that the object is in contact with the back door 20 during the closing operation, the door ECU 40 stops closing the back door 20 or reverses an operation direction of the back door 20.

An operation of the first embodiment will be described.

Specifically, an operation when the touch sensor 60 is mounted on the bracket 70 will be described with reference to FIGS. 3, 4, and 11 to 14.

As shown in FIGS. 3 and 4, when the touch sensor 60 is mounted on the bracket 70, an operator aligns the inserting portion 62 of the touch sensor 60 and the holding portion 80 of the bracket 70 in the inserting direction.

Figure 11:
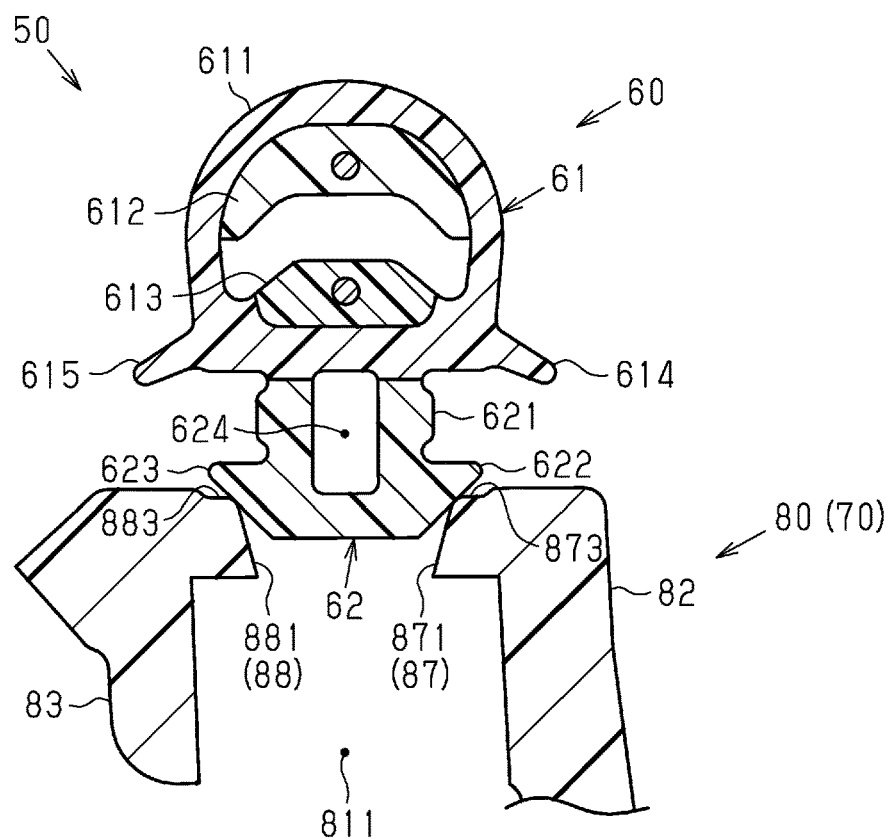
FIG. 11 is a cross-sectional view when the touch sensor is mounted on the bracket in the first embodiment.

Subsequently, as shown in FIG. 11, the operator brings the inserting portion 62 of the touch sensor 60 into contact with the holding portion 80 of the bracket 70. Specifically, in the inserting direction, the operator brings the first locking piece 622 and the second locking piece 623 of the touch sensor 60 into contact with the first locking portion 87 and the second locking portion 88 of the bracket 70, respectively.

Since the tip end surfaces of the first locking piece 622 and the second locking piece 623 are inclined with respect to the inserting direction and the tip end surfaces of the first locking portion 87 and the second locking portion 88 are inclined with respect to the inserting direction, a tip end of the inserting portion 62 is guided between the first locking portion 87 and the second locking portion 88. Since the first connecting surface 873 of the first locking portion 87 and the second connecting surface 883 of the second locking portion 88 are recessed, the tip end of the inserting portion 62 is easily guided between the first locking portion 87 and the second locking portion 88.

Then, the operator presses the touch sensor 60 toward the bracket 70. Thus, the inserting portion 62 moves between the first locking portion 87 and the second locking portion 88 in the inserting direction while elastically deforming between the first locking portion 87 and the second locking portion 88. At this time, the internal space 624 is collapsed in the longitudinal direction, and an area orthogonal to the longitudinal direction of the internal space 624 is reduced.

When the first locking piece 622 and the second locking piece 623 of the touch sensor 60 pass between the first locking portion 87 and the second locking portion 88 of the bracket 70, the inserting portion 62 is restored. In this way, the inserting portion 62 of the touch sensor 60 is accommodated in the holding portion 80 of the bracket 70. In other words, the touch sensor 60 is mounted on the bracket 70.

Figure 12:
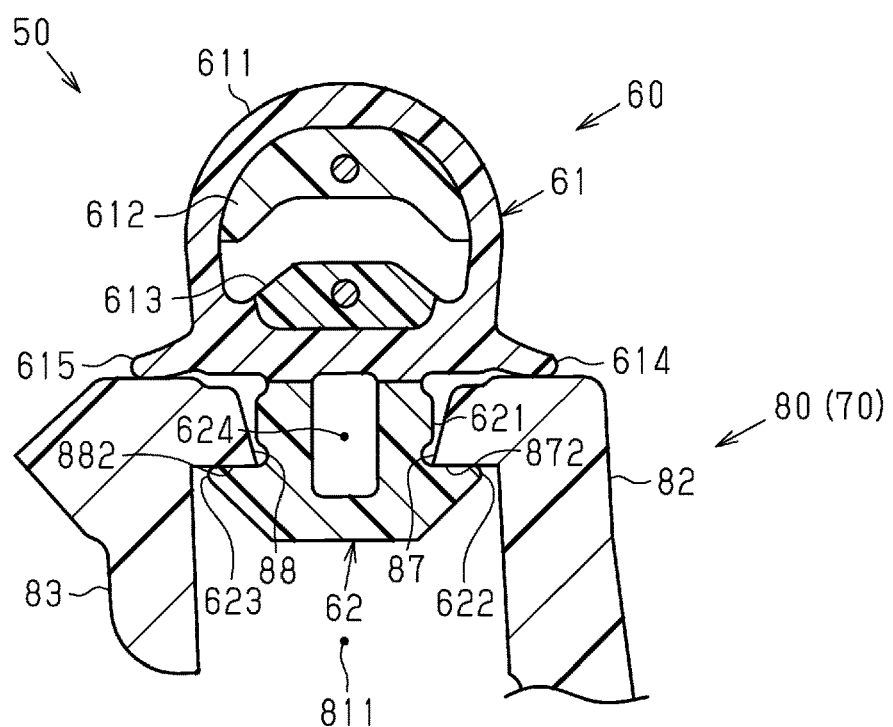
FIG. 12 is a cross-sectional view of the touch sensor unit according to the first embodiment.

As shown in FIG. 12, in a state in which the touch sensor 60 is mounted on the bracket 70, the first locking piece 622 of the touch sensor 60 is locked to the first locking portion 87 of the bracket 70, and the second locking piece 623 of the touch sensor 60 is locked to the second locking portion 88 of the bracket 70. Specifically, the first locking piece 622 is in surface contact with the first locking surface 872, and the second locking piece 623 is in surface contact with the second locking surface 882.

Figure 13:
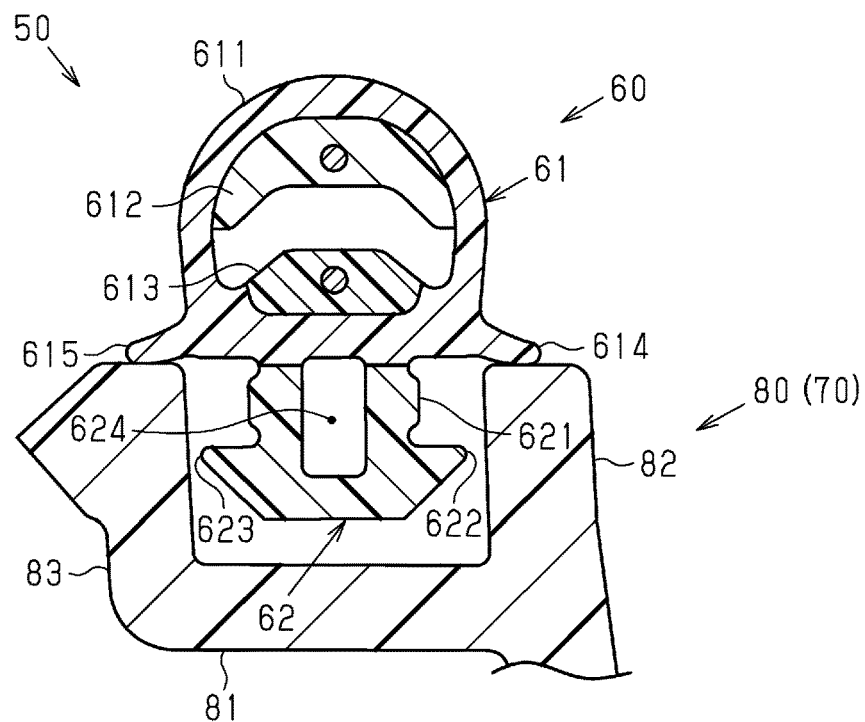
FIG. 13 is a cross-sectional view of the touch sensor unit according to the first embodiment.

Further, the first elastic piece 614 and the first locking piece 622 of the touch sensor 60 sandwich the first locking portion 87 of the bracket 70, and the second elastic piece 615 and the second locking piece 623 of the touch sensor 60 sandwich the second locking portion 88 of the bracket 70. In this way, the touch sensor 60 cannot move from the bracket 70 in the direction opposite to the inserting direction. As shown in FIG. 13, in the state in which the touch sensor 60 is mounted on the bracket 70, a gap is formed between the tip end of the inserting portion 62 of the touch sensor 60 and the bottom wall 81 of the bracket 70. In other words, a gap is provided between the tip end of the inserting portion 62 of the touch sensor 60 and the bottom wall 81 of the bracket 70.

As shown in FIG. 4, in the state in which the touch sensor 60 is mounted on the bracket 70, the positioning portion 63 of the touch sensor 60 is locked to the connecting wall 84 of the bracket 70. Specifically, the two contact pieces 631 of the touch sensor 60 are engaged with the connecting wall 84 of the bracket 70, and the two engaging grooves 632 of the touch sensor 60 are engaged with the first side wall 82 and the second side wall 83 of the bracket 70. In this way, the movement of both end portions of the touch sensor 60 in the longitudinal direction is restricted.

Figure 14:
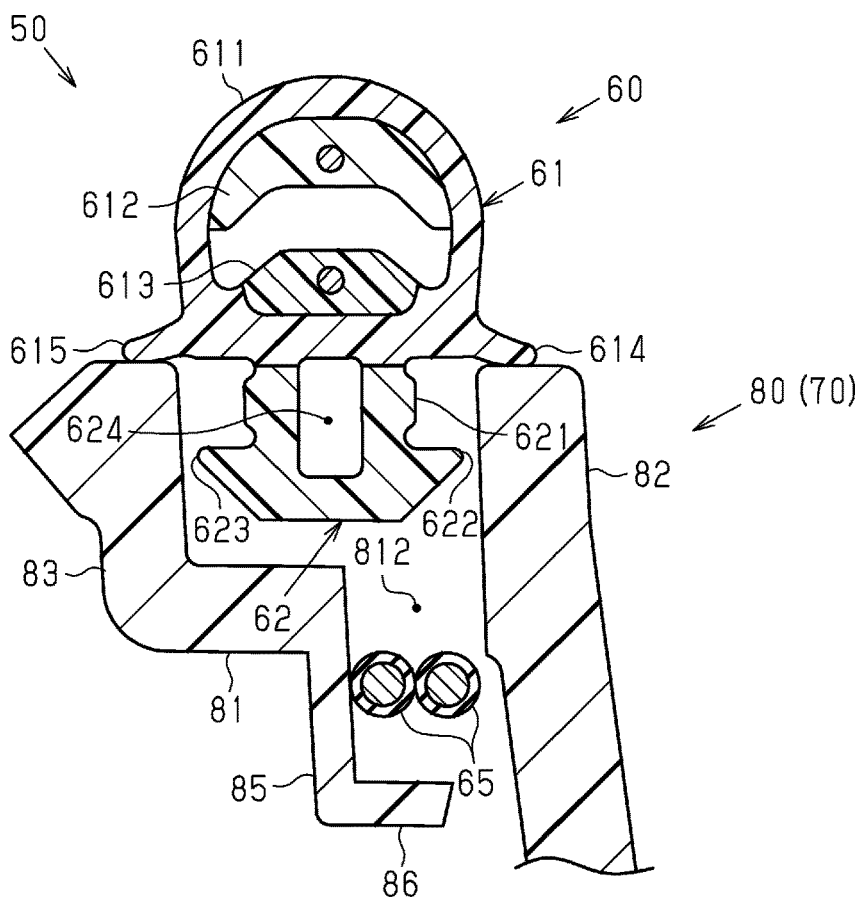
FIG. 14 is a cross-sectional view of the touch sensor unit according to the first embodiment.

As shown in FIGS. 4 and 14, when the touch sensor 60 is mounted on the bracket 70, the operator routes the wire harness 65 extending from the positioning portion 63 of the touch sensor 60 to the bracket 70. Specifically, the wire harness 65 is routed between the bottom wall 81 of the bracket 70 and the plurality of locking walls 86. That is, the wire harness 65 is routed at a position facing the inserting portion 62 of the touch sensor 60 with the bottom wall 81 interposed therebetween.

Effects of the first embodiment will be described.

(1) The touch sensor 60 includes the elastically deformable inserting portion 62, and the bracket 70 includes the holding portion 80 that accommodates the inserting portion 62. Therefore, when the touch sensor 60 is pressed against the bracket 70, the first locking piece 622 and the second locking piece 623 of the touch sensor 60 are locked to the plurality of first locking portions 87 and the plurality of second locking portions 88 of the bracket 70. That is, the touch sensor 60 is mounted on the bracket 70. In this way, the touch sensor unit 50 can improve the mountability of the touch sensor 60 on the bracket 70.

(2) The inserting portion 62 of the touch sensor 60 is made of an elastomer having a low elastic modulus, and the bracket 70 is made of a resin material having a high elastic modulus. That is, in the touch sensor unit 50, the bracket 70, which requires strength in that the bracket 70 is fixed to the back door 20, can be made of a hard material. The inserting portion 62 of the touch sensor 60 made of a soft elastomer is more easily deformed than the bracket 70 made of a hard material. Therefore, the operator can easily insert the inserting portion 62 into the holding portion 80 of the bracket 70 while deforming the inserting portion 62 of the touch sensor 60.

(3) In the holding portion 80 of the bracket 70, the bottom wall 81 includes the first through hole 811 in the portion overlapping the first locking portion 87 and the second locking portion 88 in the inserting direction. Similarly, in the holding portion 80 of the bracket 70, the bottom wall 81 includes the second through hole 812 in the portion overlapping the locking wall 86 in the inserting direction. Therefore, an undercut can be prevented from being generated in the holding portion 80 of the bracket 70. From the above, the bracket 70 can be resin-molded by a mold having no slide core.

(4) In the bracket 70, the first locking portion 87 and the second locking portion 88 face each other in the width direction. Therefore, the through hole overlapping the first locking portion 87 in the inserting direction and the through hole overlapping, in the inserting direction, the second locking portion 88 facing the first locking portion 87 in the width direction, can be integrated. That is, in the touch sensor unit 50, the number of the first through holes 811 provided in the bottom wall 81 can be reduced. In this case, manufacturing cost of the mold can be reduced by reducing the number of pins of the mold for forming the first through hole 811. A strength of the pin can be improved because the pin of the mold for forming the first through hole 811 can be thickened. Further, a holding force of the touch sensor 60 by the bracket 70 can be increased.

(5) The sensor body 61 includes the first elastic piece 614 that sandwiches the plurality of first locking portions 87 together with the first locking piece 622 and the second elastic piece 615 that sandwiches the plurality of second locking portions 88 together with the second locking piece 623. Therefore, the touch sensor unit 50 can stabilize a posture of the touch sensor 60 with respect to the bracket 70. As shown in FIGS. 12 to 14, the touch sensor unit 50 can hide a gap generated between the base 621 of the touch sensor 60 and the first locking portion 87 and the second locking portion 88 of the bracket 70 with the first elastic piece 614 and the second elastic piece 615.

(6) The holding portion 80 includes the locking wall 86 on a back surface side of the bottom wall 81. Therefore, as shown in FIGS. 4 and 14, the touch sensor unit 50 can route the wire harness 65 between the locking wall 86 and the bottom wall 81.

(7) As shown in FIG. 11, in the touch sensor 60, the tip end surface of the first locking piece 622 and the tip end surface of the second locking piece 623 are inclined toward the center in the width direction as advancing in the inserting direction. In the bracket 70, the tip end surfaces of the plurality of first locking portions 87 and the tip end surfaces of the plurality of second locking portions 88 are inclined toward the central portion in the width direction as advancing in the inserting direction. Therefore, when the touch sensor 60 is mounted, the tip end of the inserting portion 62 of the touch sensor 60 is easily guided between the plurality of first locking portions 87 and the plurality of second locking portions 88 of the bracket 70. The inserting portion 62 of the touch sensor 60 easily passes between the plurality of first locking portions 87 and the plurality of second locking portions 88 of the bracket 70. In this way, the touch sensor unit 50 can improve the mountability of the touch sensor 60 on the bracket 70.

(8) As shown in FIG. 13, in the state in which the touch sensor 60 is mounted on the bracket 70, a gap is provided between the inserting portion 62 of the touch sensor 60 and the bottom wall 81 of the bracket 70. Therefore, in the same state, the bottom wall 81 of the bracket 70 does not press the inserting portion 62 of the touch sensor 60 in the direction opposite to the inserting direction. Therefore, the touch sensor unit 50 can prevent the touch sensor 60 from being unexpectedly detached from the bracket 70.

(9) As shown in FIG. 11, the first connecting surface 873 and the second connecting surface 883 are recessed from the first end surface 821 and the second end surface 831 in the inserting direction, respectively. Therefore, when the touch sensor 60 is mounted on the bracket 70, the tip end of the inserting portion 62 of the touch sensor 60 is easily guided between the first locking portion 87 and the second locking portion 88. Since the thicknesses of the first locking portion 87 and the second locking portion 88 in the inserting direction are shortened, the first locking piece 622 and the second locking piece 623 of the touch sensor 60 easily pass between the first locking portion 87 and the second locking portion 88. Therefore, the touch sensor unit 50 can reduce an attachment failure of the touch sensor 60 due to the fact that the first locking piece 622 and the second locking piece 623 of the touch sensor 60 cannot pass between the first locking portion 87 and the second locking portion 88, and that the first locking piece 622 and the second locking piece 623 cannot abut on or be engaged with the first locking surface 872 and the second locking surface 882.

(10) For example, when the elastic modulus of the inserting portion 62 is extremely lower than the elastic modulus of the tubular portion 611, the inserting portion 62 of the touch sensor 60 may be detached from the holding portion 80 of the bracket 70 when the object is in contact with the touch sensor 60. In this regard, the elastic modulus of the inserting portion 62 is higher than the elastic modulus of the tubular portion 611. Therefore, the touch sensor unit 50 can prevent the touch sensor 60 from being unexpectedly detached from the bracket 70.

(11) In the touch sensor unit 50, the color of the inserting portion 62, which is a portion inserted into the bracket 70, is different from the color of the tubular portion 611, which is a portion not inserted into the bracket 70. Therefore, the operator can easily mount the touch sensor 60 to the bracket 70. Specifically, since the color of the inserting portion 62 of the touch sensor 60 and the color of the holding portion 80 of the bracket 70 coincide with each other, the operator can avoid a situation in which the tubular portion 611 of the touch sensor 60 is erroneously pushed into the holding portion 80 of the bracket 70.

For example, when the touch sensor 60 is correctly mounted on the bracket 70, the inserting portion 62 of the touch sensor 60 is not viewed when the touch sensor unit 50 is viewed from the inserting direction. Similarly, when the touch sensor 60 is correctly mounted on the bracket 70, the tubular portion 611, the first elastic piece 614, and the second elastic piece 615 of the touch sensor 60 are not viewed when the touch sensor unit 50 is viewed from the direction opposite to the inserting direction. Therefore, the operator can easily determine whether the touch sensor 60 is correctly mounted by viewing the touch sensor unit 50 from the inserting direction and the direction opposite to the inserting direction. The same applies to a case where the touch sensor unit 50 is imaged by a camera instead of the operator.

(12) For example, when the inserting portion 62 of the touch sensor 60 is solid in the longitudinal direction, the inserting portion 62 is less likely to be elastically deformed when the inserting portion 62 is inserted into the holding portion 80. In this regard, in the touch sensor unit 50, the inserting portion 62 of the touch sensor 60 has a hollow shape over the longitudinal direction. Therefore, when the inserting portion 62 is inserted into the holding portion 80, the inserting portion 62 is easily elastically deformed. Therefore, the touch sensor unit 50 can improve the mountability of the touch sensor 60 on the bracket 70. In other words, the touch sensor unit 50 can avoid a situation in which the touch sensor 60 is not normally mounted on the bracket 70.

Second Embodiment

Hereinafter, a touch sensor unit 50A according to a second embodiment will be described. The touch sensor unit 50A according to the second embodiment is different from the touch sensor unit 50 according to the first embodiment in the configuration of the holding portion 80 of the bracket 70. Therefore, in the description of the second embodiment, configurations common to those of the first embodiment are denoted by the same reference numerals, and descriptions and illustrations thereof are omitted.

Figure 15:
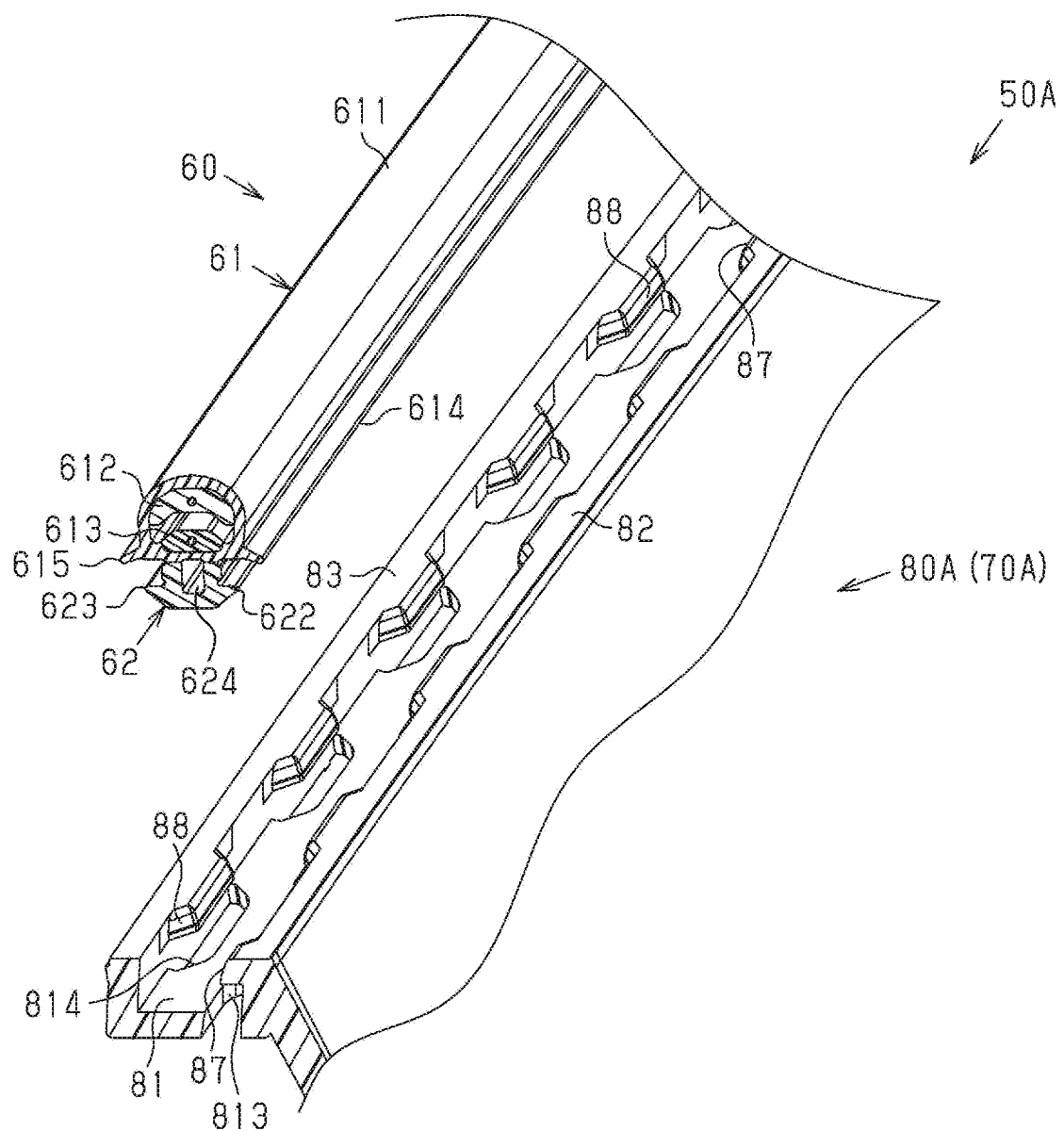
FIG. 15 is a perspective view of a touch sensor unit according to a second embodiment.

As shown in FIG. 15, the touch sensor unit 50A includes the touch sensor 60 that detects the contact with the object, and a bracket 70A that supports the touch sensor 60. The bracket 70A includes a holding portion 80A that accommodates the inserting portion 62 of the touch sensor 60, and the fixing portion 90 that is fixed to the back door 20.

Figure 16:
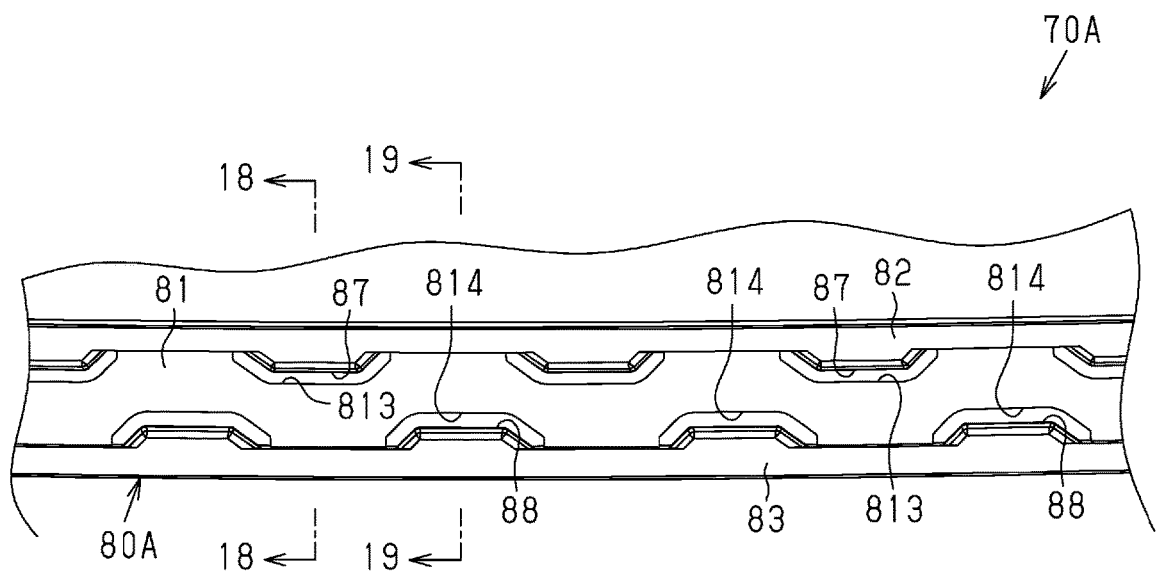
FIG. 16 is a plan view of a bracket according to the second embodiment.
Figure 17:
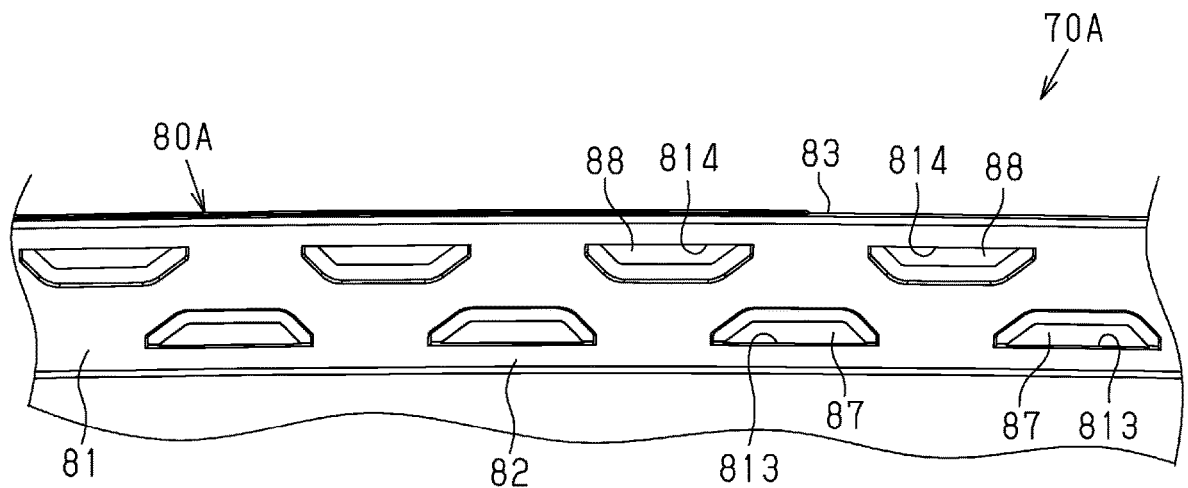
FIG. 17 is a bottom view of the bracket according to the second embodiment.

As shown in FIGS. 15 to 17, the holding portion 80A includes the bottom wall 81 extending in the longitudinal direction, the first side wall 82 and the second side wall 83 extending from the bottom wall 81, and the first locking portion 87 and the second locking portion 88 that are locked to the touch sensor 60. The bottom wall 81 includes a plurality of first through holes 813 and a plurality of second through holes 814 penetrating the bottom wall 81 in the plate thickness direction. FIG. 16 is a view of the bracket 70A as viewed from the inserting direction, and FIG. 17 is a view of the bracket 70A as viewed from the direction opposite to the inserting direction.

The plurality of first through holes 813 are located at intervals in the longitudinal direction, and the plurality of second through holes 814 are located at intervals in the longitudinal direction. The plurality of first through holes 813 are located near the first side wall 82 of the bottom wall 81 in the width direction, and the plurality of second through holes 814 are located near the second side wall 83 of the bottom wall 81 in the width direction. Therefore, the plurality of first through holes 813 and the plurality of second through holes 814 are located apart from each other in the width direction. The plurality of first through holes 813 has a surface that is continuous with an inner surface of the first side wall 82, and the plurality of second through holes 814 has a surface that is continuous with an inner surface of the second side wall 83. The inner surface of the first side wall 82 is a surface of the first side wall 82 facing the second side wall 83, and the inner surface of the second side wall 83 is a surface of the second side wall 83 facing the first side wall 82.

The plurality of first through holes 813 and the plurality of second through holes 814 have a trapezoidal shape when viewed from the inserting direction. Lengths of the first through hole 813 and the second through hole 814 in the width direction are less than the length of the bottom wall 81 in the width direction. The plurality of first through holes 813 and the plurality of second through holes 814 are displaced from each other in the width direction.

As shown in FIGS. 16 and 17, the plurality of first locking portions 87 extend from the tip end portion of the first side wall 82 toward the second side wall 83 in a state of being spaced apart in the longitudinal direction. The plurality of second locking portions 88 extend from the tip end portion of the second side wall 83 toward the first side wall 82 in a state of being spaced apart in the longitudinal direction. In the second embodiment, the plurality of first locking portions 87 and the plurality of second locking portions 88 are displaced from each other in the width direction. That is, in the width direction, the plurality of first locking portions 87 face the second side wall 83, and the plurality of second locking portions 88 face the first side wall 82. It is preferable that a formation interval of the plurality of first locking portions 87 and a formation interval of the plurality of second locking portions 88 are equal. The state in which the first locking portion 87 and the second locking portion 88 are displaced from each other in the width direction includes a state in which a part of the first locking portion 87 faces a portion of the second locking portion 88 in the width direction.

The length of the first locking portion 87 in the longitudinal direction is shorter as the first locking portion 87 approaches the second side wall 83. Similarly, the length of the second locking portion 88 in the longitudinal direction is shorter as the second locking portion 88 approaches the first side wall 82. In this regard, when viewed from the inserting direction, the first locking portion 87 and the second locking portion 88 have a trapezoidal shape.

Figure 18:
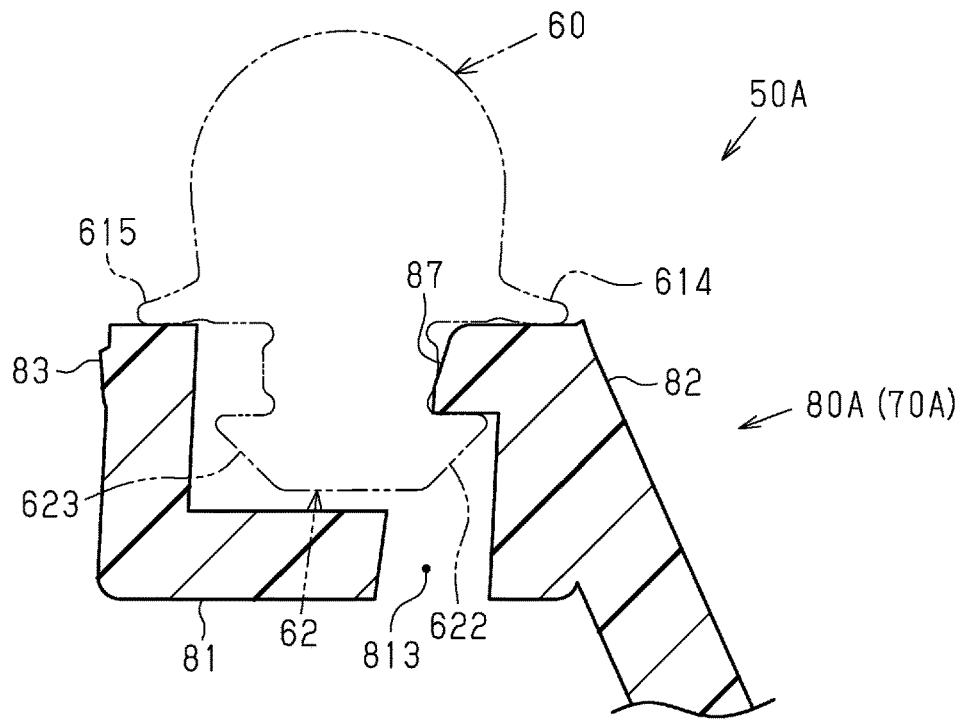
FIG. 18 is a cross-sectional view taken along line 18-18 of FIG. 16.
Figure 19:
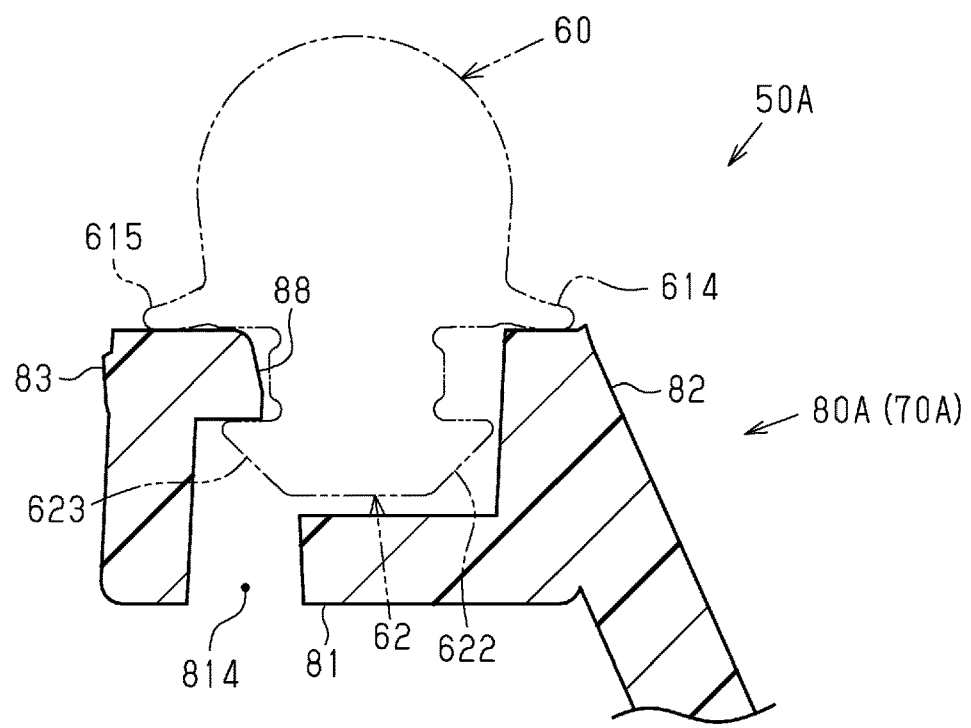
FIG. 19 is a cross-sectional view taken along line 19-19 of FIG. 16.

As shown in FIG. 18, the tip end surface of the first locking portion 87 is inclined so as to approach the second side wall 83 as advancing in the inserting direction. Similarly, as shown in FIG. 19, the tip end surface of the second locking portion 88 is inclined so as to approach the first side wall 82 as advancing in the inserting direction. That is, in the width direction, an interval between the first locking portion 87 and the second side wall 83 becomes shorter as the tip end surface of the first locking portion 87 advances in the inserting direction, and an interval between the second locking portion 88 and the first side wall 82 becomes shorter as the tip end surface of the second locking portion 88 advances in the inserting direction.

As shown in FIG. 16, when the bracket 70A is viewed from the inserting direction, the plurality of first locking portions 87 overlap the plurality of first through holes 813, and the plurality of second locking portions 88 overlap the plurality of second through holes 814. In other words, the bottom wall 81 does not exist at a position advanced in the inserting direction from the plurality of first locking portions 87 and the plurality of second locking portions 88. In this regard, it can be said that the first through hole 813 of the bottom wall 81 is provided at a portion overlapping the first locking portion 87 in the inserting direction, and the second through hole 814 of the bottom wall 81 is provided at a portion overlapping the second locking portion 88 in the inserting direction.

An operation of the second embodiment will be described.

Specifically, an operation when the touch sensor 60 is mounted on the bracket 70A will be described with reference to FIGS. 15, 18, and 19.

As shown in FIG. 15, when the touch sensor 60 is mounted on the bracket 70A, the operator presses the inserting portion 62 of the touch sensor 60 against the holding portion 80A of the bracket 70A. Thus, the inserting portion 62 moves between the first side wall 82 and the first locking portion 87, and between the second side wall 83 and the second locking portion 88 in the inserting direction while elastically deforming. When the first locking piece 622 and the second locking piece 623 of the touch sensor 60 pass between the first locking portion 87 and the second locking portion 88 of the bracket 70A, the inserting portion 62 is restored. In this way, the inserting portion 62 of the touch sensor 60 is accommodated in the holding portion 80A of the bracket 70A. In other words, the touch sensor 60 is mounted on the bracket 70A.

In the state in which the touch sensor 60 is mounted on the bracket 70A, as shown in FIG. 18, the first locking piece 622 of the touch sensor 60 is locked to the first locking portion 87 of the bracket 70A, and as shown in FIG. 19, the second locking piece 623 of the touch sensor 60 is locked to the second locking portion 88 of the bracket 70A. Further, the first elastic piece 614 and the first locking piece 622 of the touch sensor 60 sandwich the first locking portion 87 of the bracket 70A, and the second elastic piece 615 and the second locking piece 623 of the touch sensor 60 sandwich the second locking portion 88 of the bracket 70A. In this way, the touch sensor 60 cannot move from the bracket 70A in the direction opposite to the inserting direction. As shown in FIGS. 18 and 19, in the state in which the touch sensor 60 is mounted on the bracket 70A, a gap is provided between the tip end of the inserting portion 62 of the touch sensor 60 and the bottom wall 81 of the bracket 70A.

Effects of the second embodiment will be described. In the second embodiment, the following effects can be obtained in addition to the effects (1), (2), (5), (7), (8), and (10) to (12) of the first embodiment.

(13) In the holding portion 80A of the bracket 70A, the bottom wall 81 includes the first through hole 813 and the second through hole 814 in the portion overlapping the first locking portion 87 and the second locking portion 88 in the inserting direction. Therefore, the undercut can be prevented from being generated in the holding portion 80A of the bracket 70A. In other words, the touch sensor unit 50A can simplify a configuration of a mold used for molding the bracket 70A.

(14) In the bracket 70A, the plurality of first locking portions 87 and the plurality of second locking portions 88 are displaced from each other in the width direction. Therefore, the first locking piece 622 and the second locking piece 623 of the inserting portion 62 have a large number of portions to be locked by either the first locking portion 87 or the second locking portion 88 of the holding portion 80A with respect to the longitudinal direction. Therefore, the touch sensor unit 50A can stabilize the posture of the touch sensor 60 after being mounted on the bracket 70A. The touch sensor unit 50A can also reduce a force required for mounting the touch sensor 60 on the bracket 70A, in other words, a force for pressing the inserting portion 62 of the touch sensor 60 against the holding portion 80A of the bracket 70A.

The above embodiments can be modified and implemented as follows. The present embodiments and the following modifications can be implemented in combination with each other as long as the embodiments and the modifications do not have technical contradiction.

In the bracket 70 according to the first embodiment, the bottom wall 81 may not include the first through hole 811 and the second through hole 812. Similarly, in the bracket 70A according to the second embodiment, the bottom wall 81 may not include the first through hole 811 and the second through hole 812. In other words, the bracket 70 can be resin-molded with a mold using a slide core, and can also be molded by a method other than resin molding.

In the bracket 70 according to the first embodiment, the holding portion 80 may not include the erected wall 85 and the locking wall 86. In this case, it is preferable that the wire harness 65 of the touch sensor 60 is routed between the inserting portion 62 of the touch sensor 60 and the bottom wall 81 of the bracket 70, or is routed on a back surface side of the bottom wall 81 with an adhesive tape or the like.

In the second embodiment, the lengths of the first side wall 82 and the second side wall 83 in the inserting direction may be increased. In this case, when the touch sensor 60 is mounted on the bracket 70A, the gap between the tip end of the inserting portion 62 of the touch sensor 60 and the bottom wall 81 of the bracket 70A increases in size. As a result, in the touch sensor unit according to the modifications, the wire harness 65 of the touch sensor 60 can be routed in the gap.

In the second embodiment, displacement amounts of the first locking portion 87 and the second locking portion 88 in the longitudinal direction can be appropriately changed. For example, the displacement amounts can be appropriately changed based on magnitude of the force required for mounting the touch sensor 60 to the bracket 70A, the holding force of the touch sensor 60 by the bracket 70A, specifications of the mold used for manufacturing the bracket 70A, and the like.

In both of the embodiments, the lengths of the first locking portion 87 and the second locking portion 88 in the longitudinal direction may be different. In this case, as in the first embodiment, center positions of the first locking portion 87 and the second locking portion 88 in the longitudinal direction may be aligned in the width direction. As in the second embodiment, the center positions of the first locking portion 87 and the second locking portion 88 in the longitudinal direction may be displaced in the width direction.

In the inserting portion 62 of the touch sensor 60, the tip end surface of the first locking piece 622 and the tip end surface of the second locking piece 623 may not be inclined with respect to the inserting direction. Similarly, in the bracket 70, the tip end surface of the first locking portion 87 and the tip end surface of the second locking portion 88 may not be inclined with respect to the inserting direction.

In the touch sensor unit 50, the tip end of the inserting portion 62 of the touch sensor 60 and the bottom wall 81 of the bracket 70 may be in partial contact with each other.

In the touch sensor unit 50, the first conductive portion 612 and the second conductive portion 613 may be arranged in a spiral shape with respect to the longitudinal direction.

In the touch sensor 60, the inserting portion 62 and the tubular portion 611 may have the same color. The same applies to the inserting portion 62, the first elastic piece 614, and the second elastic piece 615.

The inserting portion 62 of the touch sensor 60 may not include the internal space 624. In other words, the inserting portion 62 may be solid in the longitudinal direction.

The inserting portion 62 of the touch sensor 60 may be made of a resin material having a relatively high elastic modulus. In this case, it is preferable that the holding portion 80 of the bracket 70 is made of an elastomer having a relatively low elastic modulus.

The touch sensor 60 may have a configuration corresponding to the holding portion 80 of the bracket 70. In this case, it is preferable that the bracket 70 has a configuration corresponding to the inserting portion 62 of the touch sensor 60.

The touch sensor unit 50 can also be installed along the side edge of the door opening 11 of the vehicle body 12.

The touch sensor unit 50 may be installed on one of various openings of the vehicle body 12 and opening and closing bodies that open and close the openings. An example of such an opening and closing body is a sliding door that opens and closes an opening provided in a side portion of the vehicle body 12, a roof panel that opens and closes an opening provided in a roof of the vehicle body 12, or the like.

A touch sensor unit according to an aspect of this disclosure is installed on one of an opening provided in a vehicle and an opening and closing body configured to open and close the opening. The touch sensor unit includes a touch sensor having a long sensor body, and a bracket configured to hold the touch sensor in a longitudinal direction of the sensor body and fixed to one of the opening and the opening and closing body. One of the touch sensor and the bracket includes an inserting portion including a locking piece, the other of the touch sensor and the bracket includes a holding portion including a locking portion locked to the locking piece and configured to accommodate the inserting portion, and one of the inserting portion and the holding portion is made of an elastomer having an elastic modulus lower than that of the other.

In the touch sensor unit having the above configuration, when the touch sensor is pushed into the bracket, for example, when the inserting portion is pushed into the holding portion, one of the inserting portion and the holding portion is elastically deformed. As a result, the inserting portion is accommodated in the holding portion, and the locking piece of the inserting portion is locked to the locking portion of the holding portion. In this way, the touch sensor is mounted on the bracket. From the above, the touch sensor unit can improve mountability of the touch sensor on the bracket.

In the above touch sensor unit, it is preferable that the touch sensor includes the inserting portion made of an elastomer, and the bracket includes the holding portion.

In the touch sensor unit having the above configuration, the bracket can be made of a hard material in that the inserting portion of the touch sensor is made of an elastomer. That is, in the touch sensor unit, the bracket, which requires strength in that it is fixed to one of the opening and the opening and closing body, can be made of a hard material.

In the above touch sensor unit, it is preferable that when a direction orthogonal to both an inserting direction of the inserting portion with respect to the holding portion and the longitudinal direction is defined as a width direction, the holding portion includes a bottom wall extending in the longitudinal direction and first and second side walls extending from both ends of the bottom wall in the width direction in a direction opposite to the inserting direction, the locking portion includes a plurality of first locking portions extending from a tip end portion of the first side wall toward the second side wall in a state of being spaced apart in the longitudinal direction and a plurality of second locking portions extending from a tip end portion of the second side wall toward the first side wall in a state of being spaced apart in the longitudinal direction, the plurality of first locking portions and the plurality of second locking portions are positioned so as to face each other in the width direction, and the bottom wall includes a plurality of through holes in portions overlapping the plurality of first locking portions and the plurality of second locking portions in the inserting direction.

In the holding portion of the bracket having the above configuration, the bottom wall includes a through hole in a portion overlapping the first locking portion and the second locking portion in the inserting direction. Therefore, an undercut can be prevented from being generated in the holding portion of the bracket. Further, in the bracket having the above configuration, the first locking portion and the second locking portion are aligned in the width direction. Therefore, the through hole overlapping the first locking portion in the inserting direction and the through hole overlapping the second locking portion, which is aligned with the first locking portion in the width direction, in the inserting direction can be integrated. In this case, the touch sensor unit can reduce the number of the through holes provided in the bottom wall.

In the touch sensor unit, it is preferable that when a direction orthogonal to both an inserting direction of the inserting portion with respect to the holding portion and the longitudinal direction is defined as a width direction, the holding portion includes a bottom wall extending in the longitudinal direction and first and second side walls extending from both ends of the bottom wall in the width direction in a direction opposite to the inserting direction, the locking portion includes a plurality of first locking portions extending from a tip end portion of the first side wall toward the second side wall in a state of being spaced apart in the longitudinal direction, and a plurality of second locking portions extending from a tip end portion of the second side wall toward the first side wall in a state of being spaced apart in the longitudinal direction, the plurality of first locking portions and the plurality of second locking portions are displaced from each other in the width direction, and the bottom wall includes a plurality of through holes in portions overlapping the plurality of first locking portions and the plurality of second locking portions in the inserting direction.

In the holding portion of the bracket having the above configuration, the bottom wall includes a through hole in a portion overlapping the first locking portion and the second locking portion in the inserting direction. Therefore, the undercut can be prevented from being generated in the holding portion of the bracket. Further, in the bracket having the above configuration, the plurality of first locking portions and the plurality of second locking portions are displaced from each other in the width direction. Therefore, the locking piece of the inserting portion has a large number of portions that are locked to either the first locking portion or the second locking portion in the longitudinal direction. Therefore, the touch sensor unit can stabilize a posture of the touch sensor with respect to the bracket.

In the above touch sensor unit, it is preferable that in a state in which the touch sensor is mounted on the bracket, the sensor body includes a first elastic piece configured to sandwich the plurality of first locking portions together with the locking piece, and a second elastic piece configured to sandwich the plurality of second locking portions together with the locking piece.

The touch sensor unit having the above configuration can stabilize the posture of the touch sensor with respect to the bracket.

In the above touch sensor unit, it is preferable that the holding portion includes an erected wall extending from the bottom wall in the inserting direction and a locking wall extending from a tip end of the erected wall in a direction intersecting the inserting direction, and when the through holes are defined as first through holes, the bottom wall includes second through holes in portions overlapping the plurality of locking walls in the inserting direction.

In the holding portion of the bracket having the above configuration, the bottom wall has a second through hole in a portion overlapping the locking wall in the inserting direction. Therefore, the undercut can be prevented from being generated in the holding portion of the bracket. Further, in a case where the touch sensor unit includes a wire harness, the wire harness can be held by using the locking wall after the touch sensor is mounted on the bracket.

In the above touch sensor unit, it is preferable that a tip end surface of each of the plurality of first locking portions includes a first inclined surface that is inclined so as to approach the second side wall as advancing in the inserting direction, and a tip end surface of each of the plurality of second locking portions includes a second inclined surface that is inclined so as to approach the first side wall as advancing in the inserting direction.

According to the above configuration, when the touch sensor is mounted on the bracket, the inserting portion easily passes between the plurality of first locking portions and the plurality of second locking portions. Therefore, the touch sensor unit can improve the mountability of the touch sensor on the bracket.

In the above touch sensor unit, it is preferable that a gap is provided between a tip end of the inserting portion of the sensor body and the bottom wall of the bracket.

According to the above configuration, when the touch sensor is mounted on the bracket, the bottom wall of the bracket does not press the inserting portion of the touch sensor in the direction opposite to the inserting direction. Therefore, the touch sensor unit can reduce a possibility that the touch sensor is unexpectedly detached from the bracket. The touch sensor unit can also use the gap for routing the wire harness.

In the above touch sensor unit, it is preferable that when a tip end surface of the first side wall is defined as a first end surface and a tip end surface of the second side wall is defined as a second end surface, the first locking portion has a first connecting surface configured to connect the tip end surface of the first locking portion and the first end surface, the second locking portion has a second connecting surface configured to connect the tip end surface of the second locking portion and the second end surface, in the first connecting surface, at least a portion connected to the tip end surface of the first locking portion is recessed from the first end surface in the inserting direction, and in the second connecting surface, at least a portion connected to the tip end surface of the second locking portion is recessed from the second end surface in the inserting direction.

In the touch sensor unit having the above configuration, the first connecting surface and the second connecting surface are recessed from the first end surface and the second end surface in the inserting direction, respectively. Therefore, when the touch sensor is mounted on the bracket, the tip end of the inserting portion of the touch sensor is easily guided between the first locking portion and the second locking portion. Since thicknesses of the first locking portion and the second locking portion in the inserting direction are shortened, the locking piece of the touch sensor easily passes between the first locking portion and the second locking portion. Therefore, the touch sensor unit can reduce an attachment failure of the touch sensor due to a fact that the locking piece of the touch sensor does not pass between the first locking portion and the second locking portion, in other words, the locking piece of the touch sensor cannot be engaged with the first locking portion and the second locking portion.

In the above touch sensor unit, it is preferable that the sensor body includes a tubular portion made of an insulating elastomer and first and second conductive portions arranged inside the tubular portion at intervals in a direction orthogonal to the longitudinal direction, and the inserting portion has an elastic modulus higher than that of the tubular portion.

For example, when the elastic modulus of the inserting portion is extremely lower than the elastic modulus of the tubular portion, the inserting portion of the touch sensor may be detached from the holding portion of the bracket when an object is in contact with the touch sensor. In this regard, in the touch sensor unit having the above configuration, the elastic modulus of the inserting portion is higher than the elastic modulus of the tubular portion. Therefore, the touch sensor unit can reduce occurrence of the above-described situation.

In the above touch sensor unit, it is preferable that the sensor body includes the tubular portion made of an insulating elastomer, and the first and second conductive portions arranged inside the tubular portion at intervals in the direction orthogonal to the longitudinal direction, and the inserting portion and the tubular portion have different colors.

According to the above configuration, a color of the inserting portion, which is a portion inserted into the bracket, and a color of the tubular portion, which is a portion not inserted into the bracket, are different. For example, when the inserting portion of the touch sensor cannot be fully inserted into the holding portion of the bracket, there is a possibility that the color of the inserting portion can be confirmed when viewed from the inserting direction. Therefore, the touch sensor unit can reduce occurrence of a mounting defect when the touch sensor is mounted.

In the above touch sensor unit, it is preferable that the inserting portion has a hollow shape over the longitudinal direction.

For example, when the inserting portion of the touch sensor is solid in the longitudinal direction, the inserting portion is less likely to be elastically deformed when the inserting portion is inserted into the holding portion. In this regard, in the touch sensor unit having the above configuration, the inserting portion of the touch sensor has a hollow shape over the longitudinal direction. Therefore, when the inserting portion is inserted into the holding portion, the inserting portion is easily elastically deformed. Therefore, the touch sensor unit can further improve the mountability of the touch sensor on the bracket.

The touch sensor unit can improve the mountability of the touch sensor on the bracket.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A touch sensor unit installed on one of an opening provided in a vehicle and an opening and closing body configured to open and close the opening, the touch sensor unit comprising:
   a touch sensor having a sensor body; and
   a bracket configured to hold the touch sensor in a longitudinal direction of the sensor body and fixed to one of the opening and the opening and closing body, wherein
   one of the touch sensor and the bracket includes an inserting portion including a locking piece,
   an other of the touch sensor and the bracket includes a holding portion including a locking portion locked to the locking piece and configured to accommodate the inserting portion,
   the inserting portion includes base portion that extends an inserting direction of the inserting portion, the base portion including an internal space that extends in the longitudinal direction, and
   one of the inserting portion and the holding portion is made of an elastomer having an elastic modulus lower than that of the other.

2. The touch sensor unit according to claim 1, wherein
   the touch sensor includes the inserting portion made of an elastomer, and
   the bracket includes the holding portion.

3. The touch sensor unit according to claim 2, wherein
   when a direction orthogonal to both an inserting direction of the inserting portion with respect to the holding portion and the longitudinal direction is defined as a width direction,
   the holding portion includes a bottom wall extending in the longitudinal direction and first and second side walls extending from both ends of the bottom wall in the width direction in a direction opposite to the inserting direction,
   the locking portion includes a plurality of first locking portions extending from a tip end portion of the first side wall toward the second side wall in a state of being spaced apart in the longitudinal direction, and a plurality of second locking portions extending from a tip end portion of the second side wall toward the first side wall in a state of being spaced apart in the longitudinal direction,
   the plurality of first locking portions and the plurality of second locking portions are displaced from each other in the width direction, and
   the bottom wall includes a plurality of through holes in portions overlapping the plurality of first locking portions and the plurality of second locking portions in the inserting direction.

4. The touch sensor unit according to claim 3, wherein
   the holding portion includes an erected wall extending from the bottom wall in the inserting direction, and a locking wall extending from a tip end of the erected wall in a direction intersecting the inserting direction, and
   when the plurality of through holes are defined as first through holes, the bottom wall includes second through holes in portions overlapping a plurality of locking walls in the inserting direction.

5. The touch sensor unit according to claim 2, wherein
   the sensor body includes a tubular portion made of an insulating elastomer, and first and second conductive portions arranged inside the tubular portion at intervals in a direction orthogonal to the longitudinal direction, and
   the inserting portion has an elastic modulus higher than that of the tubular portion.

6. The touch sensor unit according to claim 2, wherein
   the sensor body includes a tubular portion made of an insulating elastomer, and first and second conductive portions arranged inside the tubular portion at intervals in a direction orthogonal to the longitudinal direction, and
   the inserting portion and the tubular portion have different colors.

7. The touch sensor unit according to claim 1, wherein
   the inserting portion has a hollow shape over the longitudinal direction.

8. The touch sensor unit according to claim 1, wherein
   the locking piece includes
   a first locking piece that extends outward from a tip end of the base portion of the inserting portion, and
   a second locking piece that extends from the tip end of the base portion in a direction opposite to the first locking piece.

9. The touch sensor unit according to claim 8, wherein
   a first tip end surface of the first locking piece and a second tip end surface of the second locking piece are inclined toward a center of the inserting portion in a width direction as advancing in the inserting direction.

10. A touch sensor unit installed on one of an opening provided in a vehicle and an opening and closing body configured to open and close the opening, the touch sensor unit comprising:

a touch sensor having a sensor body; and a bracket configured to hold the touch sensor in a longitudinal direction of the sensor body and fixed to one of the opening and the opening and closing body, wherein one of the touch sensor and the bracket includes an inserting portion including a locking piece, an other of the touch sensor and the bracket includes a holding portion including a locking portion locked to the locking piece and configured to accommodate the inserting portion, one of the inserting portion and the holding portion is made of an elastomer having an elastic modulus lower than that of the other, the touch sensor includes the inserting portion made of an elastomer, and the bracket includes the holding portion, when a direction orthogonal to both an inserting direction of the inserting portion with respect to the holding portion and the longitudinal direction is defined as a width direction, the holding portion includes a bottom wall extending in the longitudinal direction and first and second side walls extending from both ends of the bottom wall in the width direction in a direction opposite to the inserting direction, the locking portion includes a plurality of first locking portions extending from a tip end portion of the first side wall toward the second side wall in a state of being spaced apart in the longitudinal direction, and a plurality of second locking portions extending from a tip end portion of the second side wall toward the first side wall in a state of being spaced apart in the longitudinal direction, the plurality of first locking portions and the plurality of second locking portions are positioned so as to face each other in the width direction, and the bottom wall includes a plurality of through holes in portions overlapping the plurality of first locking portions and the plurality of second locking portions in the inserting direction.

11. The touch sensor unit according to claim 10, wherein in a state in which the touch sensor is mounted on the bracket, the sensor body includes a first elastic piece configured to sandwich the plurality of first locking portions together with the locking piece, and a second elastic piece configured to sandwich the plurality of second locking portions together with the locking piece.

12. The touch sensor unit according to claim 10, wherein a tip end surface of each of the plurality of first locking portions includes a first inclined surface that is inclined so as to approach the second side wall as advancing in the inserting direction, and a tip end surface of each of the plurality of second locking portions includes a second inclined surface that is inclined so as to approach the first side wall as advancing in the inserting direction.

13. The touch sensor unit according to claim 10, wherein a gap is provided between a tip end of the inserting portion of the sensor body and the bottom wall of the bracket.

14. The touch sensor unit according to claim 10, wherein when a tip end surface of the first side wall is defined as a first end surface and a tip end surface of the second side wall is defined as a second end surface, the first locking portions have a first connecting surface configured to connect a tip end surface of the first locking portions and the first end surface, the second locking portions have a second connecting surface configured to connect a tip end surface of the second locking portions and the second end surface, in the first connecting surface, at least a portion connected to the tip end surface of the first locking portions are recessed from the first end surface in the inserting direction, and in the second connecting surface, at least a portion connected to the tip end surface of the second locking portions are recessed from the second end surface in the inserting direction.

* * * * *